United States Patent [19]
Ishibashi et al.

[11] Patent Number: 5,848,036
[45] Date of Patent: Dec. 8, 1998

[54] OPTICAL DISK DRIVE EQUIPPED WITH WAVEFORM EQUALIZER AND FOCUS ADJUSTMENT CIRCUIT

[75] Inventors: Hiromichi Ishibashi, Ibarakisi; Ryusuke Horibe; Toshiyuki Shimada, both of Koubesi, all of Japan

[73] Assignee: Matsushita Electric Industrial Co., Ltd., Japan

[21] Appl. No.: 876,478

[22] Filed: Jun. 16, 1997

[30] Foreign Application Priority Data

Jun. 20, 1996 [JP] Japan ................................ 8-159367

[51] Int. Cl.⁶ ....................................................... G11B 7/09
[52] U.S. Cl. ................................. 369/44.29; 369/44.35; 369/44.28
[58] Field of Search ............................. 369/44.29, 44.35, 369/44.36, 44.34, 44.28, 54

[56] References Cited

U.S. PATENT DOCUMENTS 5,663,942 9/1997 Ishibashi et al. ..................... 369/44.34
5,751,675 5/1998 Tsutsui et al. ....................... 369/44.29

FOREIGN PATENT DOCUMENTS 7-50415 5/1995 Japan .

*Primary Examiner*—Thang V. Tran
*Attorney, Agent, or Firm*—Parkhurst & Wendel

[57] ABSTRACT

An optical disk drive for reading information recorded on a recording surface of an optical disk medium using an optical head to generate a read-out signal, comprises focus position control means for controlling a focal point of a light beam emitted from the optical head so that it is positioned on a focus position that is set as a position in the vicinity of the recording surface of the optical disk medium; equalizing means for performing waveform equalization using a set equalization quantity, to the read-out signal generated by the optical head, and outputting an equalization signal; jitter measuring means for measuring a jitter of the equalization signal output from the equalizing means; and optimum value searching means for searching for a focus position and an equalization quantity, at which the jitter is minimized. In this optical disk drive, for both the focus position and the equalization quantity, the jitter minimized point can be searched accurately.

15 Claims, 15 Drawing Sheets

Fig.15 (a)
Fig.15 (b)
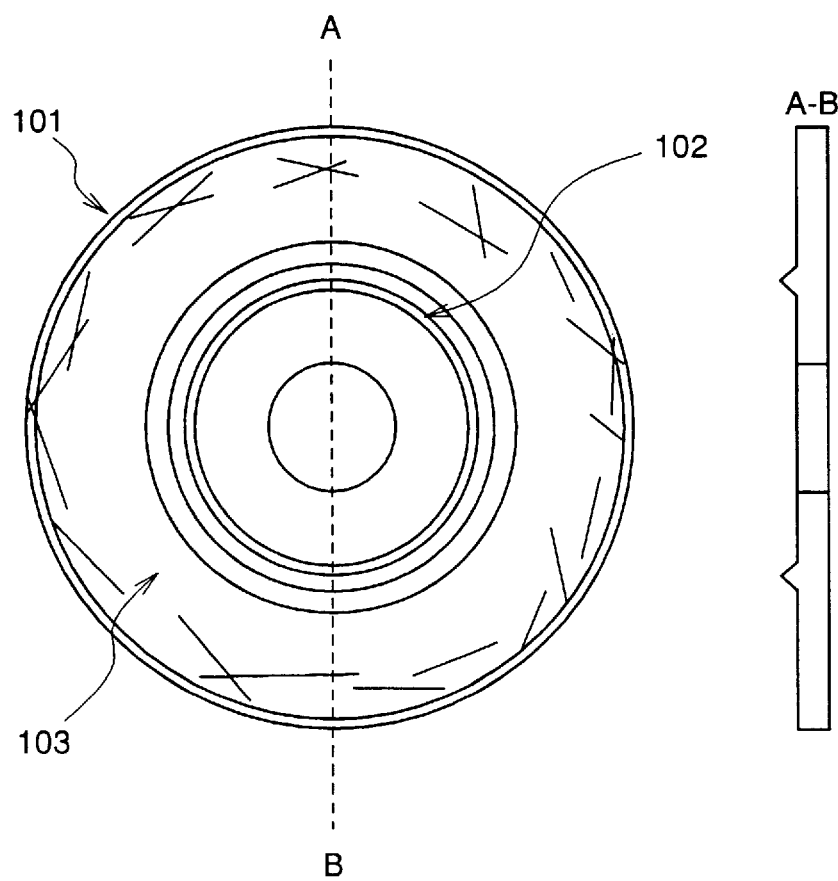

OPTICAL DISK DRIVE EQUIPPED WITH WAVEFORM EQUALIZER AND FOCUS ADJUSTMENT CIRCUIT

FIELD OF THE INVENTION

The present invention relates to optical disk drives for reproducing information recorded densely on optical disk media, such as digital video disks (digital versatile disks). More particularly, the invention relates to optical disk drives equipped with signal equalizing means and focus adjusting means for precise reproduction.

BACKGROUND OF THE INVENTION

Recently, in the field of magnetic recording using, for example, VTRs or hard disks, high density recording has been demanded strongly, and various techniques have been proposed for high density recording. However, with an increase in recording density, the risk of recording and reproduction errors increases. Therefore, 'waveform equalization' in which errors in reproduction of recorded information are reduced by processing read-out signals, acquires greater importance. FIG. 17 is a block diagram illustrating a magnetic recording signal reproduction apparatus capable of automatically performing such waveform equalization.

In FIG. 17, reference numeral 900 designates a magnetic recording medium wherein information is recorded. A magnetic read head 901 is applied to the magnetic recording medium 900 to read information recorded in the medium 900. A read amplifier 902 amplifies a signal read by the head 901 and outputs a read-out signal HF. A variable equalizing filter 903 is used as equalizing means, and outputs a signal QF. For the variable equalizing filter 903, the degree of equalization is determined according to a control signal X output from a minimum value searching means which is described later. More specifically, the frequency band of the signal HF to be amplified and the gain of the amplification are determined as the degree of equalization. A jitter measuring means 904 measures the amount of jitter of the signal QF and outputs the measured amount as a jitter detection signal JT. Here, 'jitter' is a mean value or a root mean square value of errors of synchronization between the read-out signal transition timing and the reference clock, and it is used as an estimation value for control, as a physical quantity closely relating to the reproduction error rate. A minimum value searching means 905 searches for the control signal X that minimizes the jitter detection signal JT.

First of all, the meaning of waveform equalization in reproduction of densely recorded information will be explained. It is premised that digital information is densely recorded on the magnetic recording medium 900. More specifically, on the magnetic recording medium 900, digital information is recorded as a series (list) of '1' and '0'. This list is fundamentally a random one and, on the whole, it is arranged according to an appropriate modulation rule. However, in detail, according to the information, a pattern in which '1' and '0' alternate at relatively short periods (hereinafter referred to as short pattern) and a pattern in which '1' and '0' alternate at relatively long periods (hereinafter referred to as long pattern) are mixed in the list. When the recording medium 900 is highly densified close to the limit of resolution of the magnetic head 901, in reproduction by scanning the medium 900 with the magnetic head 901, a phenomenon called 'intersymbol interference' (interference between '1' and '0') occurs in the portion having the short pattern. So, this portion is reproduced with a smaller amplitude than the portion having the long pattern.

Since the amplitude is directly linked with the S/N (signal-to-noise ratio), when the portion with the short pattern is reproduced, the S/N signal of the read-out signal is degraded, resulting in incorrect reproduction of information.

To avoid the above-mentioned problem, waveform equalization is carried out. When the magnetic head is scanning the magnetic recording medium 900 at a constant linear velocity, the read-out signal of the short pattern is positioned in a relatively high frequency band. The variable equalizing filter 903 restores the information signal by relatively increasing the gain of the high frequency band in which the read-out signal HF degrades, thereby reducing the reproduction error rate. In this way, a reduction in amplitude due to intersymbol interference is compensated to some degree. However, when the gain is excessively increased, the effect extends to the lower frequency band, resulting in distortion over the waveform. This is an over-equalized state, and this state results in a reduction in quality of the read-out signal. As described above, waveform equalization has a proper quantity, and the proper quantity is searched automatically by feedback control.

In the prior art signal reproduction apparatus so constructed, equalization process with such feedback control is performed as follows.

The magnetic read head 901 reads information recorded in the recording medium 901 and outputs a signal to the read amplifier 902. The read amplifier 902 amplifies the signal read by the head 901 and outputs a read-out signal HF to the equalizing filter 903. The equalizing filter 903 performs equalization by increasing the gain in the higher frequency band according to a control signal X, and outputs an equalization signal QF. The equalization signal QF is an output from the reproduction unit and, also, it is input to the jitter measuring means 904 for control. The jitter measuring means 904 measures a jitter of the equalization signal QF and outputs the result as a jitter detection signal JT to the minimum value searching means 905. Using the jitter detection signal JT as an estimation value, the minimum value searching means 905 searches for an optimum equalization quantity at which the jitter detection signal JT is minimized. To find such an optimum equalization quantity, for example, the following method is employed. Initially, the control signal X is changed slightly to increase and decrease the equalization quantity by very small quantities, and variations in the jitter of the read-out signal with the variations in the equalization quantity are detected. Then, the equalization quantity is increased or decreased by changing the control signal X in the jitter decreasing direction.

In the prior art magnetic recording signal reproduction apparatus, an optimum waveform equalization quantity is automatically determined as described above, so that information can be reproduced from a high-density magnetic recording medium while maintaining a low error rate (refer to Japanese Published Patent Application (examined) No. Hei. 6-9340).

For optical disk carriers which have been spread as mass storage recording media in recent years, there is a tendency to increase in recording density, as symbolized by the advent of DVDs. Therefore, the importance of waveform equalization for the optical disk media is considerable.

In our recent research, however, the following fact was found. That is, when the above-mentioned control of equalization quantity according to the prior art, which is used for magnetic recording media, is applied as it is to an optical disk drive, an actually optimum equalization quantity is not always obtained. This is explained briefly hereinafter.

When information is read from a magnetic recording medium, such as a magnetic disk or tape, a read head touches, or almost touches, the recording medium. On the order hand, in an optical disk drive, before reading of information from an optical disk, an optical head is moved so that a focal point of laser light is correctly positioned on a recording surface of the optical disk, i.e., focus control is performed. In this case, the optical head is moved for three purposes, i.e., scanning on the surface of the medium, tracking, and focusing. As compared with the case of the magnetic recording medium in which only scanning and tracking are performed, control of the head position is complicated, and the complicated control adversely affects the control in the equalization process.

When there is an offset in focus control, i.e., when the recording medium is out of focus, the resolution of the head deteriorates, resulting in a further reduction in the amplitude of the high frequency component of the read-out signal. Even with such an offset, it is possible to set an equalization quantity at which the jitter is minimized, using the control method according to the prior art. In this case, however, when the focus is adjusted later, the set equalization quantity is an over-equalized one, and the jitter increases conversely.

This phenomenon occurs when a focus position once offset returns to its original position, i.e., when it is offset in the negative direction. For example, when generation of a focus offset due to expansion of the head with laser heat is expected, in order to remove the offset in a short time after turning on the laser, the head is adjusted in advance so that it is offset in the positive direction.

Furthermore, when an optimum equalization quantity has been determined by the prior art method and a focus point at which the jitter is minimized is in its offset state, it is difficult to search for an optimum focus position while referring to the jitter. That is, in the perfectly focused state, over equalization occurs, and the jitter increases. So, it is hard to converge to the optimum focus state, resulting in difficulty in focus control.

Furthermore, there are other problems relating to characteristics of optical disk carriers. When an optical disk carrier, such as a compact disk (CD) or a video disk, is being used, its surface is exposed in many cases. So, the surface is easily damaged. Since the read-out signal jitter is significantly disturbed by defects on the disk surface, the precision in searching for the minimum jitter is reduced.

Further, focus control is not performed perfectly, and the focus easily deviates due to disturbance or shock. For example, even though the focus is satisfactorily adjusted in ordinary reproduction, when the optical head is jumped from a track to another track on the optical disk (hereinafter referred to as track jumping), the focus deviates due to shock at this time, and the jitter deteriorates momentarily. In this case, accurate reading of addresses is not possible, and a target track cannot be recognized, with a result that the track jumping is repeated many times.

SUMMARY OF THE INVENTION

It is an object of the present invention to provide an optical disk drive that can perform both of focus control and waveform equalization control accurately.

It is another object of the present invention to provide an optical disk drive that can reduce influences of defects of an optical disk carrier on control with a jitter as an estimation value.

It is still another object of the present invention to provide an optical disk drive that can perform both of focus control and waveform equalization control with accurately even when the focus is disturbed due to track jumping.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an optical disk drive for reading information recorded on a recording surface of an optical disk medium using an optical head to generate a read-out signal, and the optical disk drive comprises focus position control means for controlling a focal point of a light beam emitted from the optical head so that it is positioned on a focus position that is set as a position in the vicinity of the recording surface of the optical disk medium; equalizing means for performing waveform equalization using a set equalization quantity, to the read-out signal generated by the optical head, and outputting an equalization signal; jitter measuring means for measuring a jitter of the equalization signal output from the equalizing means; and optimum value searching means for searching for a focus position and an equalization quantity, at which the jitter is minimized.

According to a second aspect of the present invention, the optimum value searching means is two-dimensional searching means that searches for the focus position and the equalization quantity, at which the jitter is minimized, by two-dimensionally changing the focus position and the equalization quantity.

According to a third aspect of the present invention, the two-dimensional searching means comprises differential operating means for obtaining differential values of the jitter to the focus position and the equalization quantity; vector operating means for obtaining a two-dimensional vector on the basis of the differential values obtained by the differential operating means; and focus position and equalization quantity setting means for updating the focus position and the equalization quantity in the direction of the two-dimensional vector obtained by the vector operating means. The two-dimensional searching is performed by repeating the operation to obtain the differential values by the differential operating means, the operation to obtain the vector by the vector operating means, and the setting of the focus position and the equalization quantity by the focus position and equalization quantity setting means.

According to a fourth aspect of the present invention, the two-dimensional searching means comprises minimum value searching means for setting a focus position and searching for an equalization quantity at which the jitter is minimized in the set focus position; under-equalizing means for setting an equalization quantity that is under-equalized as compared with the searched equalization quantity; and focus position searching means for searching for a focus position in which the jitter is minimized at the equalization quantity set by the under-equalizing means. The two-dimensional searching is performed by repeating the searching for the equalization quantity by the minimum value searching means, the setting of the equalization quantity by the under-equalizing means, and the searching for the focus position by the focus position searching means.

According to a fifth aspect of the present invention, the two-dimensional searching means includes initial value setting means for setting 'under-equalized state' as an initial value.

According to a sixth aspect of the present invention, the optical disk drive further comprises amplitude measuring means for measuring an amplitude of the read-out signal generated by the optical head, and the optimum value searching means comprises minimum value searching means for searching for an equalization quantity at which the jitter is minimized, by changing the equalization quantity; and maximum value searching means for searching for a focus position in which the amplitude is maximized, by changing the focus position.

According to a seventh aspect of the present invention, the optical disk drive further comprises tracking control means for setting the focus position on the same track on the optical disk medium; and jitter averaging means for calculating the average of the jitter for a single round of the track.

According to an eighth aspect of the present invention, the optical disk drive further comprises defect detecting means for detecting defects on the optical disk medium; and calculation control means for stopping the calculation by the jitter averaging means when the detecting means detects a defect.

According to a ninth aspect of the present invention, the defect detecting means detects a defect by comparing the jitter of the read-out signal with a threshold value.

According to a tenth aspect of the present invention, the optical disk drive further comprises transfer means for moving the optical head in the radial direction of the optical disk medium; and transfer control means for controlling the transfer means so that the optical head is positioned at the possible innermost circumference of the optical disk medium before execution of the searching by the optimum value searching means.

According to an eleventh aspect of the present invention, the optical disk medium has a projection in a region near the innermost circumference.

According to a twelfth aspect of the present invention, the optical disk drive further comprises equalization quantity switch means for selecting, as an equalization quantity used by the equalizing means, one of the value searched by the optimum value searching means and a value that is set in advance and over-equalized as compared with the searched value.

According to a thirteenth aspect of the present invention, the equalization quantity switch means uses the set value when track jumping of the optical head is performed on the optical disk medium, and uses the value searched by the optimum value searching means when track jumping is not performed.

According to a fourteenth aspect of the present invention, the optimum value searching means does not perform the searching when track jumping is performed.

BRIEF DESCRIPTION OF THE DRAWINGS

FIGS. 15(a) and 15(b) are a plan view and a cross-sectional view, respectively, illustrating an optical disk used for the fifth embodiment of the invention.

DETAILED DESCRIPTION OF THE PREFERRED EMBODIMENTS

[Embodiment 1]

In an optical disk drive according to a first embodiment of the present invention, a minimum jitter point is searched accurately, for both of focus position and equalization quantity, using maximum gradient method.

Figure 1:
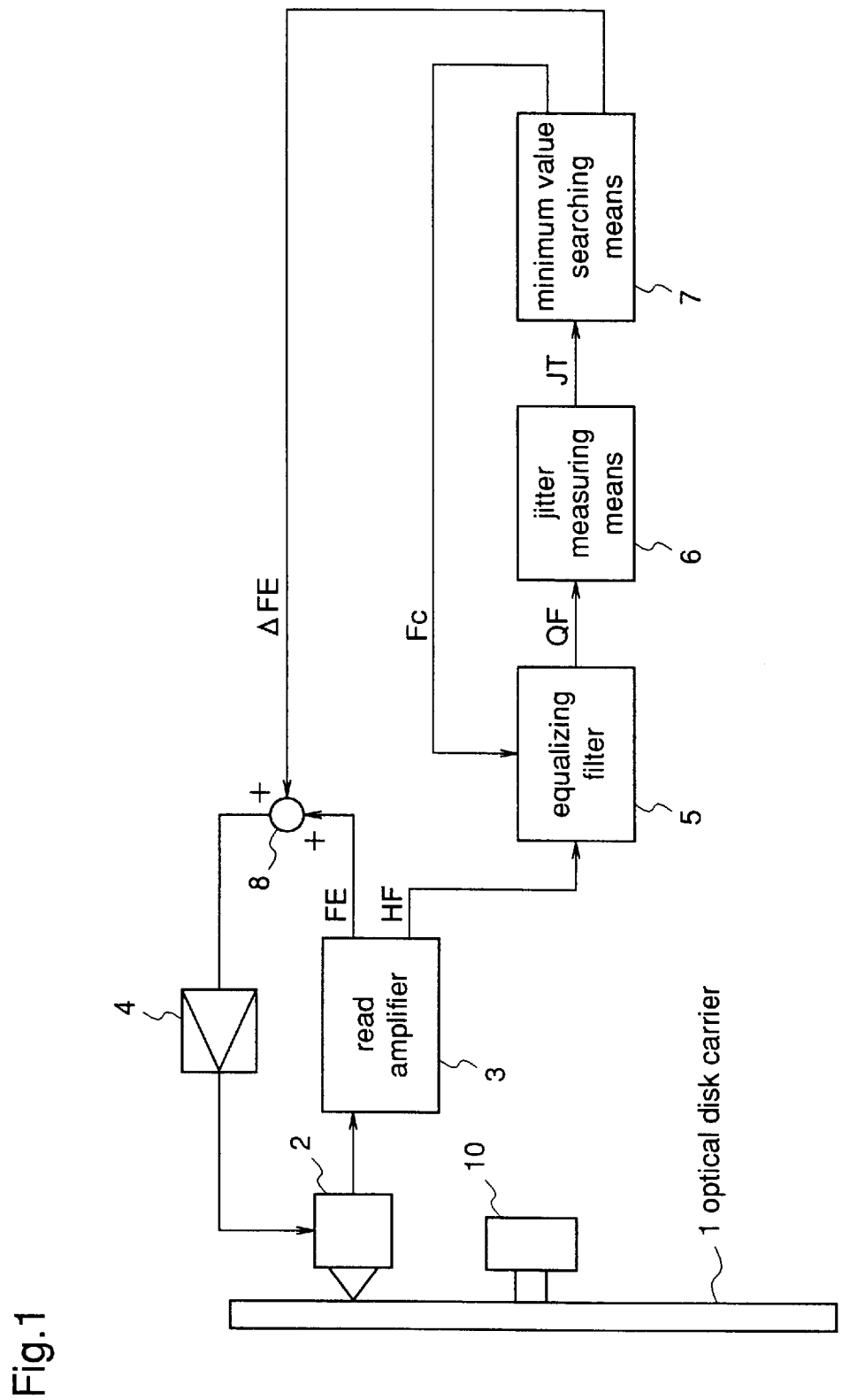
FIG. 1 is a block diagram illustrating a structure of an optical disk drive according to a first embodiment of the present invention.

FIG. 1 is a block diagram illustrating an optical disk drive according to the first embodiment of the present invention. In FIG. 1, reference numeral 1 designates an optical disk (optical disk carrier) in which information is recorded. An optical head 2 reads information recorded in the optical disk 1. A read amplifier 3 amplifies a signal read by the optical head 2 and outputs a read-out information signal HF. The read amplifier 3 generates a focus error signal FE as well. A servo amplifier 4 control the focus position of the optical head 2. An equalizing filter 5 is used as equalizing means. The equalizing filter 5 performs waveform equalization according to a cut-off frequency Fc for the read-out information signal HF, and outputs an equalization signal QF. A jitter measuring means 6 measures a jitter of the equalization signal QF and outputs the result as a jitter detection signal JT. A minimum value searching means 7 changes the focus position compensation signal ΔFE and the cut-off frequency Fc relatively so that the jitter detection signal JT has its minimum value. An adder 8 adds the focus error signal FE output from the read amplifier 3 to the focus position compensation signal ΔFE output from the minimum value searching means 7, and outputs the result to the servo amplifier 4. A spindle motor 10 rotates the optical disk 1.

A description is now given of the operation of the optical disk drive to control focus position and waveform equalization.

When a control signal from the servo amplifier 4 is input to a focus actuator of the optical head 2, the optical head 2 determines a focus position, focuses a laser beam on the recording surface of the optical disk 1, reads information recorded on the optical disk, and outputs the result to the read amplifier 3. The read amplifier 3 amplifies a signal output from the optical head 2, and outputs a read-out information signal HF to the equalizing filter 5.

The equalizing filter 5 performs equalization according to a cut-off frequency Fc output from the minimum value searching means 7, and outputs an equalization signal QF. The equalization signal QF is an output from the reproduction unit and, also, it is input to the jitter measuring means 6 for control. The jitter measuring means 6 measures a jitter of the equalization signal QF, and outputs the result to the minimum value searching means 7, as a jitter detection signal JT.

The minimum value searching means 7 searches for a focus position and an equalization quantity, at which the jitter (jitter detection signal JT) is minimized, by maximum gradient method which is later described in more detail. Then, the searching means 7 outputs a focus compensation signal $\Delta$FE to the adder 8 according to the focus position obtained by the searching, and outputs a cut-off frequency Fc to the equalization filter 5 according to the equalization quantity obtained by the searching.

In the equalization filter 5, since the cut-off frequency Fc is used for the equalizing process, control of waveform equalization is performed. On the other hand, in the adder 8, the focus error signal FE output from the read amplifier 3 is added to the compensation signal $\Delta$FE. The result of the addition is fed back, through the servo amplifier 4, to the focus actuator of the optical head 2, whereby control of focus position is performed.

Figure 2:
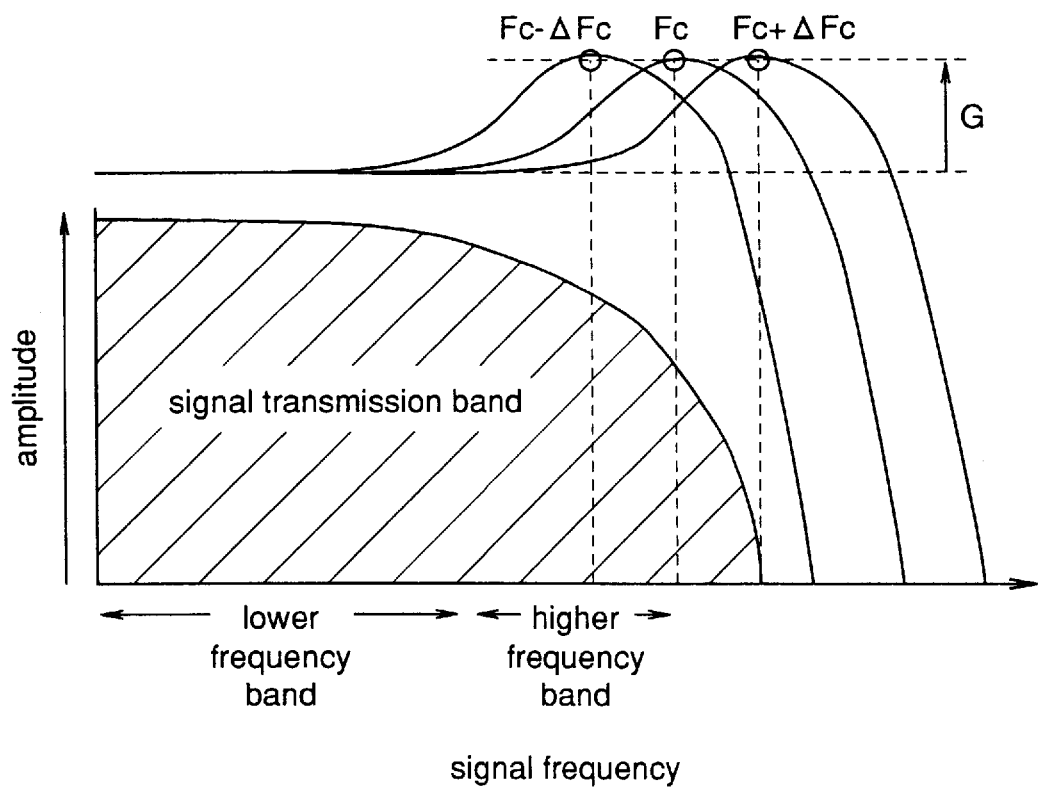
FIG. 2 is a diagram for explaining the operation of an equalizing filter included in the optical disk drive shown in FIG. 1.

The characteristics of the equalizing filter 5 will be described using FIG. 2. A transversal filter can be employed as the equalizing filter 5. Alternatively, a Bessel filter and an equi-ripple filter can be employed. Any filter can be employed as long as it has a relative gain G at a particular cut-off frequency Fc as shown in FIG. 2 and either of the cut-off frequency and the relative gain is variable adaptively to an input control signal. In the optical disk drive according to the first embodiment, the equalizing filter 5 is used for changing the cut-off frequency Fc. Since the gain in the higher frequency band of the read-out information signal HF increases with a reduction in the cut-off frequency Fc (Fc→Fc−$\Delta$Fc), the reduction in the cut-off frequency Fc results in an increase in the equalization quantity. Conversely, the equalization quantity decreases with an increase in the cut-off frequency (Fc→Fc+$\Delta$Fc). In this way, the equalization quantity can be controlled by the cut-off frequency.

Figure 3:
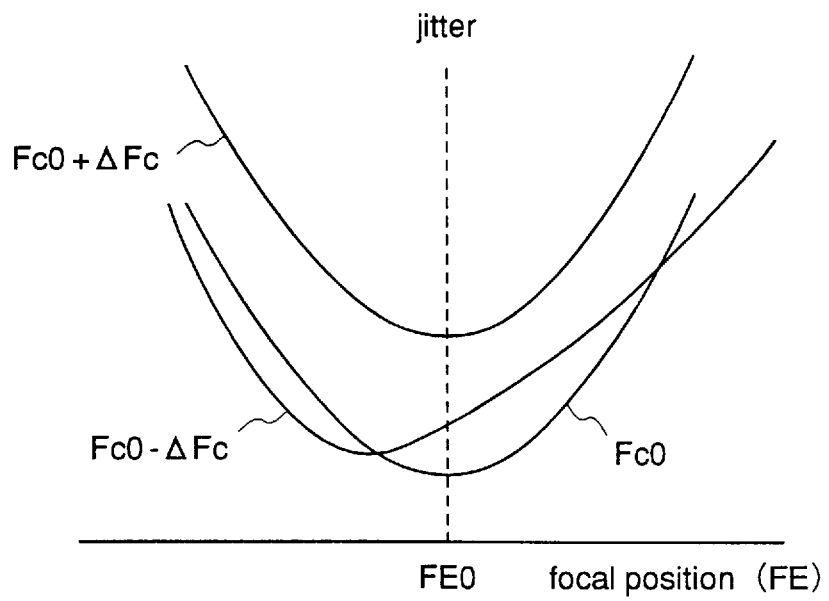
FIGS. 3(a) and 3(b) are diagrams for explaining jitter change relative to equalization quantity and focus position.
Figure 3:
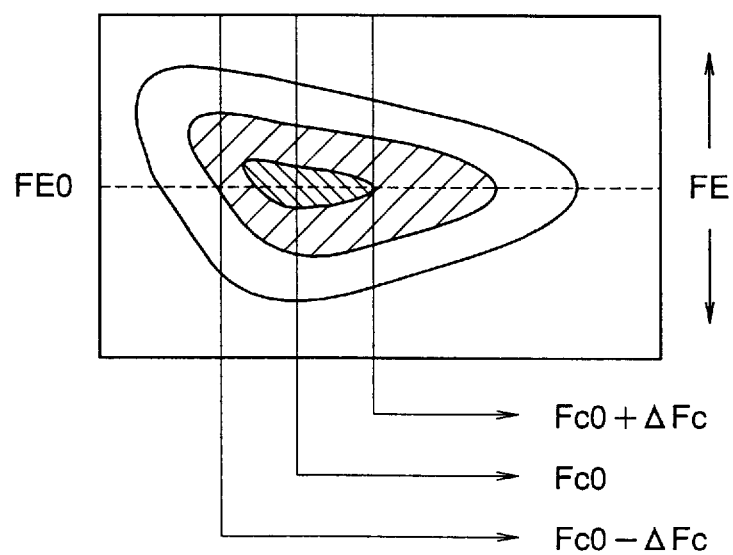
Figure 4:
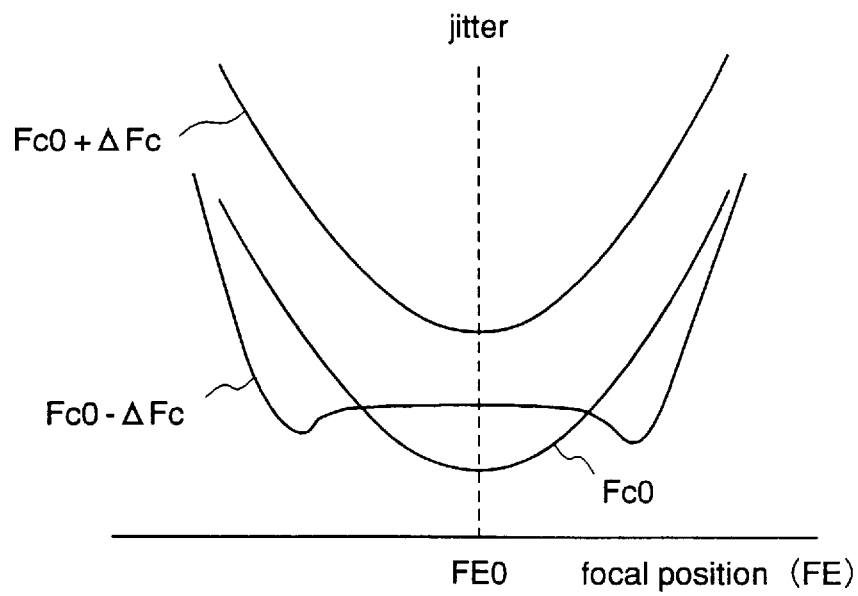
FIG. 4 is a diagram for explaining jitter change relative to equalization quantity and focus position.

Next, in order to explain a searching method employed by the minimum value searching means 7, setting of equalization quantity (cut-off frequency) and typical focus vs. jitter characteristic corresponding to the setting will be described using FIGS. 3(a), 3(b), and 4.

First of all, in FIG. 3(a), when an optimum equalization quantity is obtained at a cut-off frequency Fc0, a minimum jitter is obtained at a just focused point FE0 where no focus deviation occurs. The jitter increases when the cut-off frequency decreases (→Fc0−$\Delta$Fc: over equalization) or increases (→Fc0+$\Delta$Fc: under equalization). Especially when the cut-off frequency is low (over equalization), the focus vs. jitter characteristic is asymmetrical as shown in FIG. 3(a). In this case, a minimum jitter is not obtained at the just focused point FE0 with no focus error, but it is obtained at a point slightly off the point FE0. Further, as shown in FIG. 4, in the over-equalized state, minimal jitter points appear at both sides of the focal point. The difference between the characteristics shown in FIG. 3(a) and the characteristics shown in FIG. 4 is attributed to the aberration peculiar to the optical head (spherical aberration, comatic aberration, or astigmatism). Anyway, in the over-equalized state, an optimum equalization quantity should be given to a signal in worse reproduction condition and, in this regard, it may happen that the jitter decreases when the focus deviates.

The above-mentioned relationships of cut-off frequency, focus position, and jitter cause the following problems. When the focus position is adjusted so that the jitter as an estimation value has its minimum (minimal) value, an actual focal point cannot be searched. In contract with this, when there is a focus offset, even though the cut-off frequency of the equalizing filter 5 is adjusted so that the jitter is minimized, it is sometimes converged to the over-equalized state (Fc0−$\Delta$Fc). Therefore, it is desired to control the equalizing filter and the focus position, not individually, but in connection with each other. In other words, it is necessary to consider both the cut-off frequency of the equalizing filter and the focus position in the focus control two-dimensionally at the same time. The relationship between the cut-off frequency and the focus position is shown in FIG. 3(b). FIG. 3(b) is a contour map with the cut-off frequency Fc on its abscissa and the focus position on its ordinate. In addition, the jitter is shown by gradation. The thicker the gradation is, the smaller the jitter is. Graphs shown in FIG. 3(a) are obtained by plotting the cross-sectional views at which the equalizing filter cut-off frequencies obtained from the contour map are Fc0−$\Delta$Fc, Fc0, and Fc0+$\Delta$Fc, respectively. It is found from the contour map that there is only one minimum jitter point at the intersection between the particular equalizing filter cut-off frequency Fc0 and the focus position FE0. Accordingly, in order to minimize the read-out signal jitter, this combination must be searched two-dimensionally.

The minimum value searching means 7 executes the two-dimensional searching. In the optical disk drive according to this first embodiment, since the minimum value searching means 7 is implemented by a microprocessor, even a complicated searching process is easily realized by programing. In addition, the minimum value searching means 7 employs maximum gradient method.

Figure 5:
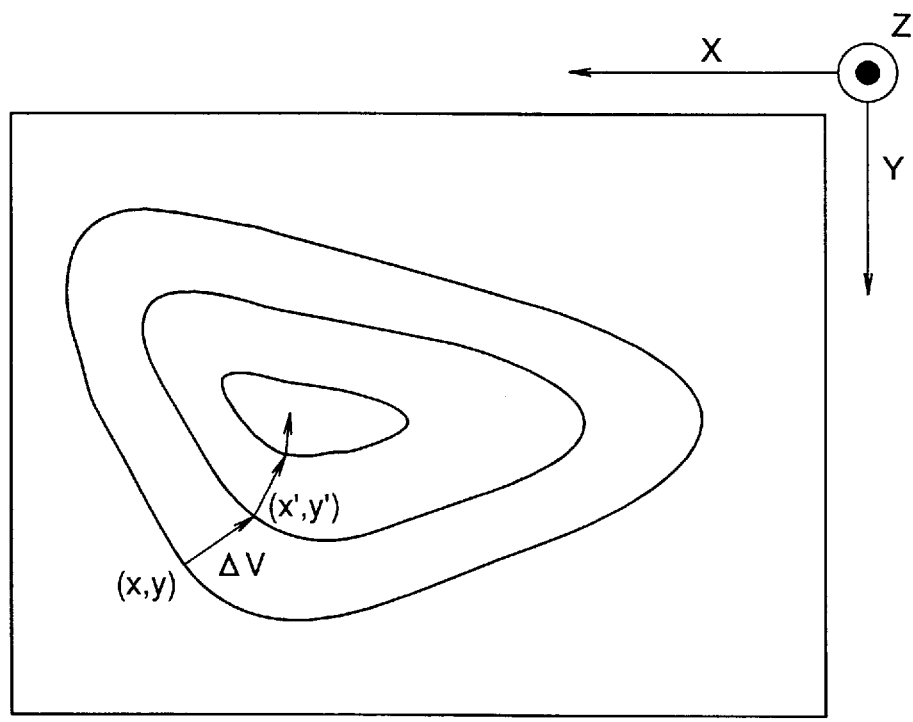
FIG. 5 is a diagram for explaining the operation of a minimum value searching means included in the optical disk drive shown in FIG. 1.

The maximum gradient method will be explained using FIG. 5. For simplification, it is assumed that the equalizing filter cut-off frequency Fc is x, the focus position which can be expressed by the focus error signal FE is y, and the jitter JT is z. A vector G in the vertical direction of the contour shown in FIG. 5 is given by $$G=(\partial z/\partial x, \partial z/\partial y) \quad (1)$$

More specifically, in order to obtain vector G, x (cut-off frequency Fc) and y (focus position FE) are individually changed by extremely small amounts, and variations in the jitter with these changes are stored temporarily and then divided by the respective amounts. Thereafter, the present position of (x,y) is moved to a new coordinate (x',y') which is apart from (x,y) by a vector $\Delta$V that is given by $$\Delta V=(-\epsilon \cdot \partial z/\partial x, -\epsilon \cdot \partial z/\partial y) \quad (2)$$

wherein $\epsilon$ is a constant which can be experimentally obtained in advance.

Next, the new coordinate is obtained according to the following formulae (3) and (4).

$$x' = x - \epsilon \cdot \partial z/\partial x \quad (3)$$

$$y' = y - \epsilon \cdot \partial z/\partial y \quad (4)$$

To be specific, x' and y' are supplied, as a new value of the equalizing filter cut-off frequency Fx and a focus position compensation value (FE+ΔFE), to the equalizing filter 5 and the adder 8, respectively.

Thereafter, using the coordinate (x',y') obtained in formulae (3) and (4) as (x,y), vectors G and ΔV are obtained in formulae (1) and (2), and a new coordinate is obtained in formulae (3) and (4). By repeating this process, as shown in FIG. 5, (x,y) draws loci vertical to the contours and converges to a point where the jitter is minimized. Accordingly, as a result of the searching, the two-dimensional variables x and y are respectively obtained as an equalizing filter cut-off frequency FC0 and a focus position that can be expressed by a focus error signal FE0, at which the jitter is minimized.

As described above, the optical disk drive according to this first embodiment is provided with the minimum value searching means 7 that searches for an equalizing filter cut-off frequency and a focus position, at which the jitter is minimized, using the maximum gradient method. Therefore, both the waveform equalizing process and the focus position are controlled accurately.

The algorithm mentioned above, i.e., formulae (2) to (4) used in the maximum gradient method by the minimum value searching means 7, is merely an example, and a variety of modifications are considered in practical use. For example, although a two-dimensional vector (x,y) is obtained at once in formula (2), x (Fc) and y (FE) may be alternatingly changed in formula (2) and then alternatingly subjected to formulae (3) and (4).

[Embodiment 2]

In an optical disk drive according to a second embodiment of the present invention, a minimum jitter point is searched accurately, for both focus position and equalization quantity, using a simplified searching method that utilizes two-dimensional jitter characteristics.

The structure of the optical disk drive according to this second embodiment is identical to the structure already described with respect to FIG. 1. Further, the operation of the optical disk drive is identical to the operation already described for the first embodiment except the searching method performed by the minimum value searching means 7.

Hereinafter, the simplified method of two-dimensional searching according to this second embodiment will be described using FIGS. 6 and 7. This method utilizes the characteristics of the contour map shown in FIG. 3(b), and searching is performed along lines T1 to T4 shown in FIG. 7.

First of all, a sufficiently high value (T0) is set as an initial cut-off frequency of the equalizing filter 5. That is, a sufficiently small value is set as an initial equalization quantity. In this case, searching is simplified as mentioned later.

In the process of T1 (first stage), the equalizing filter cut-off frequency is shifted by an appropriate amount toward the lower frequency side to increase the equalization quantity, and a change in the jitter is detected. When the cut-off frequency Fc is gradually reduced from the sufficiently high initial value, the equalization quantity gradually increases, and the jitter gradually decreases. When the searching proceeds and the jitter reaches the bottom, the jitter starts to increase, and the rate of change Gx turns to positive. In this first stage, an optimum value at which the jitter is in its minimal state is obtained for the equalizing filter cut-off frequency.

At this time, if the light beam from the head 2 happens to be in focus, an optimum cut-off frequency Fc is searched. However, it might be in the over-equalized state as mentioned above. So, the processes of T2 and T3 are performed to search for an optimum focus value (second stage).

In the searching method according to this second embodiment, in the process of T2, the equalizing filter cut-off frequency is shifted so that it is slightly under-equalized. The reason is as follows. As shown in FIG. 3(a), the focus vs. jitter characteristic is symmetrical only when the equalizing filter cut-off frequency is optimum or under-equalized, and the searching accuracy is improved when the focus vs. jitter characteristic is symmetrical. In the process of T3, an optimum focus value at which the jitter is minimized is searched.

In the third stage, after setting the focus position at the optimum focus value obtained in the second stage, an equalizing filter cut-off frequency at which the jitter is minimized is searched again. In this third stage, the equalizing filter cut-off frequency, which has been set at an under-equalized value when the process proceeds from the first stage to the second stage, is used as an initial value for the searching process.

Figure 6:
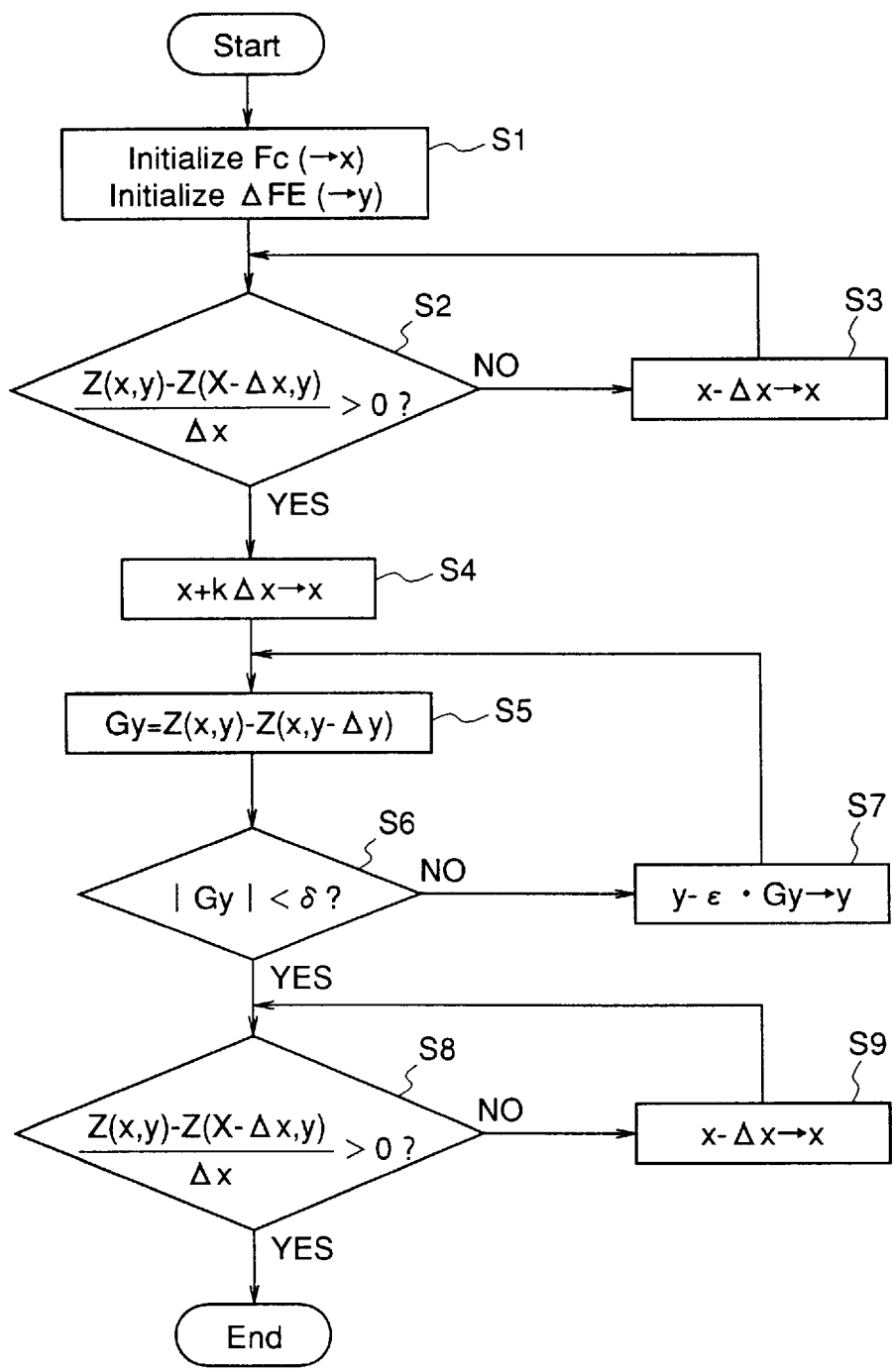
FIG. 6 is a flowchart showing a procedure of minimum value searching performed by an optical disk drive according to a second embodiment of the present invention.
Figure 7:
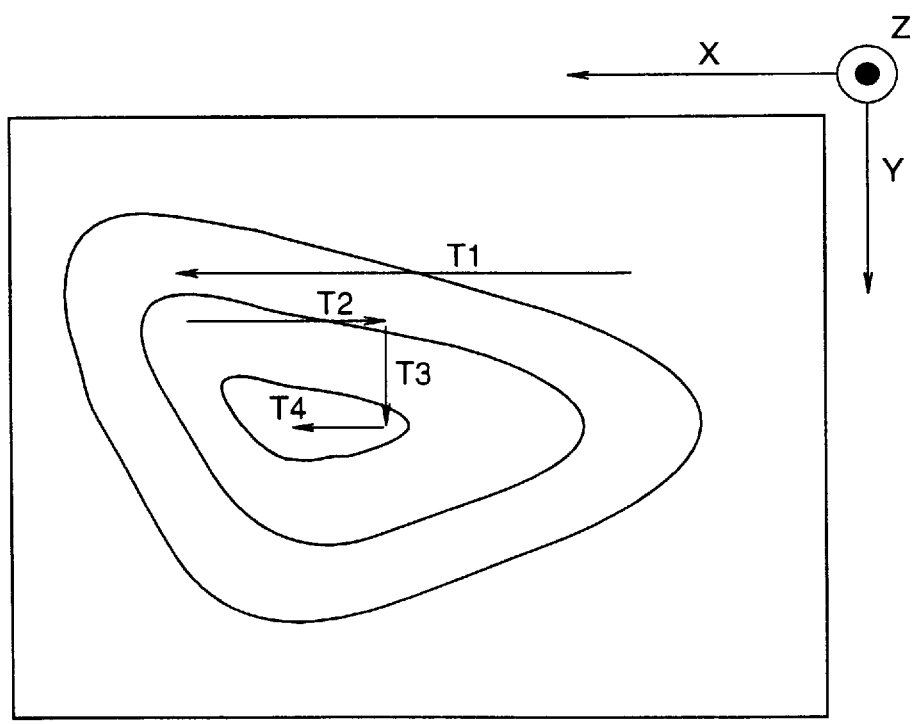
FIG. 7 is a diagram for explaining the procedure of the optical disk drive according to the second embodiment of the invention.

FIG. 6 is a flowchart showing algorithm of the searching method employed by the minimum value searching means 7. The above-mentioned first stage comprises steps 1 to 4 wherein the vicinity of an optimum value of equalizing filter cut-off frequency is subjected to searching. The second state comprises steps 5 to 7 wherein an optimum value of the focus position is searched. The third stage comprises steps 8 to 9 wherein an optimum value of the equalizing filter cut-off frequency is obtained. Hereinafter, according to the flowchart shown in FIG. 6, the operation of the minimum value searching means 7 will be described.

Initially, in step 1, an initial value of the equalizing filter cut-off frequency Fc (variable x) and an initial value of the focus position (variable y) that can be expressed by the focus error signal FE are set. When the equalizing filter cut-off frequency is set at a sufficiently high initial value, the Fc searching direction is decided, so that it is not necessary to obtain a gradient vector, whereby the operation is simplified as compared with the maximum gradient method according to the first embodiment. On the other hand, the focus position is set at an initial value at which reproduction of signals is possible. Or, it may be roughly adjusted according to a read-out signal amplitude or a tracking error signal as mentioned later. These initial values can be calculated in advance in an examination or simulation.

In step 2, using Δx that is set as a variation in the equalizing filter cut-off frequency, i.e., variable x, the variable x is shifted toward the lower frequency side (x−Δx), and a change in the jitter JT at this time (z(x,y)−z(x−Δx,y)) is measured. Then, the change in the jitter JT is divided by Δx to obtain a rate of change Gx, and it is decided whether Gx is positive or negative. Since x is initially set at a sufficiently high value, Gx is a negative value, so that step 3 is followed by step 2. Until it is decided in step 2 that Gx is a positive value, the variable x is increased by Δx.

This process corresponds to the above-mentioned searching process of T1 and, therefore, when the cut-off frequency Fc is gradually reduced from a sufficiently high value, the equalization quantity increases gradually, and the jitter decreases with the increase in the equalization quantity. Although the rate of change Gx is negative at the beginning of the searching, when the jitter reaches its bottom and starts to increase, Gx turns to positive. Then, step 4 is executed.

Step 4 corresponds to the above-mentioned process of T2. In step 4, the variable x at which the jitter is minimal, obtained in the process of T1, is increased by k$\Delta$x to put the variable x in the slightly under-equalized state. As mentioned above, this step is to obtain the symmetrical focus vs. jitter characteristic for accurately performing the following focus searching.

Hereinafter, the relationship between the symmetry of the focus vs. jitter characteristic and the searching method will be described. In the maximum gradient method according to the first embodiment, it is necessary to obtain a differential vector as shown in formula (2). In order to obtain the differential vector accurately, the denominator $\partial y$ (a difference in focus offsets) must be small. However, when the denominator $\partial y$ is small, the numerator $\partial z$ (a difference in measured jitters) becomes small to noise, resulting in poor accuracy in detecting the vector. On the other hand, in the searching method according to this second embodiment, in steps 5 to 6 shown in FIG. 6, differentiation is not performed, but a difference in jitters when the focus offset is changed in the positive and negative directions is obtained. Since it is premised that the focus vs. jitter characteristic is symmetrical, when the jitters obtained by changing the focus by $\pm\Delta y$ are equal to each other, the jitter has its minimum value at the point of $\pm 0$. Hence, unlike $\partial y$ used in the differentiation according to the first embodiment, it is not necessary for the difference $\Delta y$ to be a very small value. Preferably, the difference $\Delta y$ should be sufficiently larger than $\delta$, with regard to the precision.

In step 5, the variable y (focus) is shifted by $\pm\Delta y$, and a difference Gy in jitter change at this time (Gy=z(x,y+$\Delta$y)−z(x,y−$\Delta$y)) is calculated. In step 6, it is decided whether or not the absolute value of difference Gy (|Gy|) is smaller than $\delta$. In other words, the focus is shifted in opposite directions by equal quantities, and it is decided whether or not an error in jitters at this time is smaller than $\delta$. When it is decided in step 6 that the error is not smaller than $\delta$, the variable y is changed to y−$\epsilon$·Gy ($\epsilon$: constant) to compensate the central value of the focus offset by $\epsilon$·Gy, followed by repetition of steps 5 and 6. Until it is decided in step 6 that the error is smaller than $\delta$, steps 5 to 7 are repeated. When it is decided in step 6 that the error is smaller than $\delta$, the process of T3 is ended, followed by step 8.

Steps 8 and 9 correspond to the above-mentioned process of T4, and these steps are identical to steps 2 and 3. That is, using, as an initial value, the cut-off frequency Fc (x) which has been set at an under-equalized value in step 4 (T2), a value of Fc (x) at which the jitter is minimized is searched again. When it is decided in step 8 that Gx is a positive value, searching is ended.

In the procedure mentioned above, the variable $\Delta$x of the equalizing filter cut-off frequency, the variable $\Delta$y of the focus position, and the constants k and $\epsilon$ can be calculated in advance in an experiment or simulation, like the initial values of x and y.

As described above, in the optical disk drive according to the second embodiment of the invention, the minimum value searching means 7 searches for an equalizing filter cut-off frequency and a focus position, at which the jitter is minimized, by the searching method utilizing that the focus vs. jitter characteristic is symmetrical only when the equalizing filter is optimum or under-equalized. Therefore, both the waveform equalization and the focus position are controlled accurately.

When the maximum gradient method according to the first embodiment is employed, two-dimensional searching can be executed accurately and, theoretically, at high speed. This is based on a premise that the differential calculation shown by formula (1) is executed accurately at high speed. In fact, however, it is necessary for calculation of a two-dimensional partial differential to measure at least three close points, and the measuring time and precision may adversely affect the practical use of the apparatus.

When the initial value of focus offset is set close to a focal point, the time required for convergence in the following searching process is reduced, resulting in high-speed processing. For this purpose, the focus offset may be roughly adjusted so that the jitter is approximately minimized. In this method, however, the symmetry of focus vs. jitter characteristic is not secured. So, using the amplitude of the read-out information signal or the tracking error signal as an evaluation value, the focus is adjusted so that the amplitude is maximized. This method using other evaluation values will be described later in [Embodiment 3].

Further, when the initial cut-off frequency Fc of the equalizing filter is set at a value in the vicinity of an optimum frequency and higher than the optimum frequency, steps 1 to 4 are not necessary. Such an initial value can be obtained in advance in an experiment or simulation. In this case, the processing load is further reduced, resulting in high-speed processing. However, optical disk carriers are interchangeable media, and the characteristics significantly vary due to differences in formation conditions. So, it is difficult to set an initial value close to an optimum value without appropriate learning. Therefore, to employ the method using an initial value set as mentioned above involves the risk of reducing precision. Furthermore, when optimization of focus offset is performed when the initial value is excessively under-equalized, the S/N ratio of the read-out information signal reduces significantly, so that sufficient precision cannot be secured. Therefore, appropriate setting of initial value is desired.

[Embodiment 3]

In an optical disk drive according to a third embodiment of the present invention, an amplitude of read-out signal or tracking error signal is used as an estimation value when a focus position is searched, and the searching for a focus position is performed independently of searching for an equalization quantity.

Figure 8:
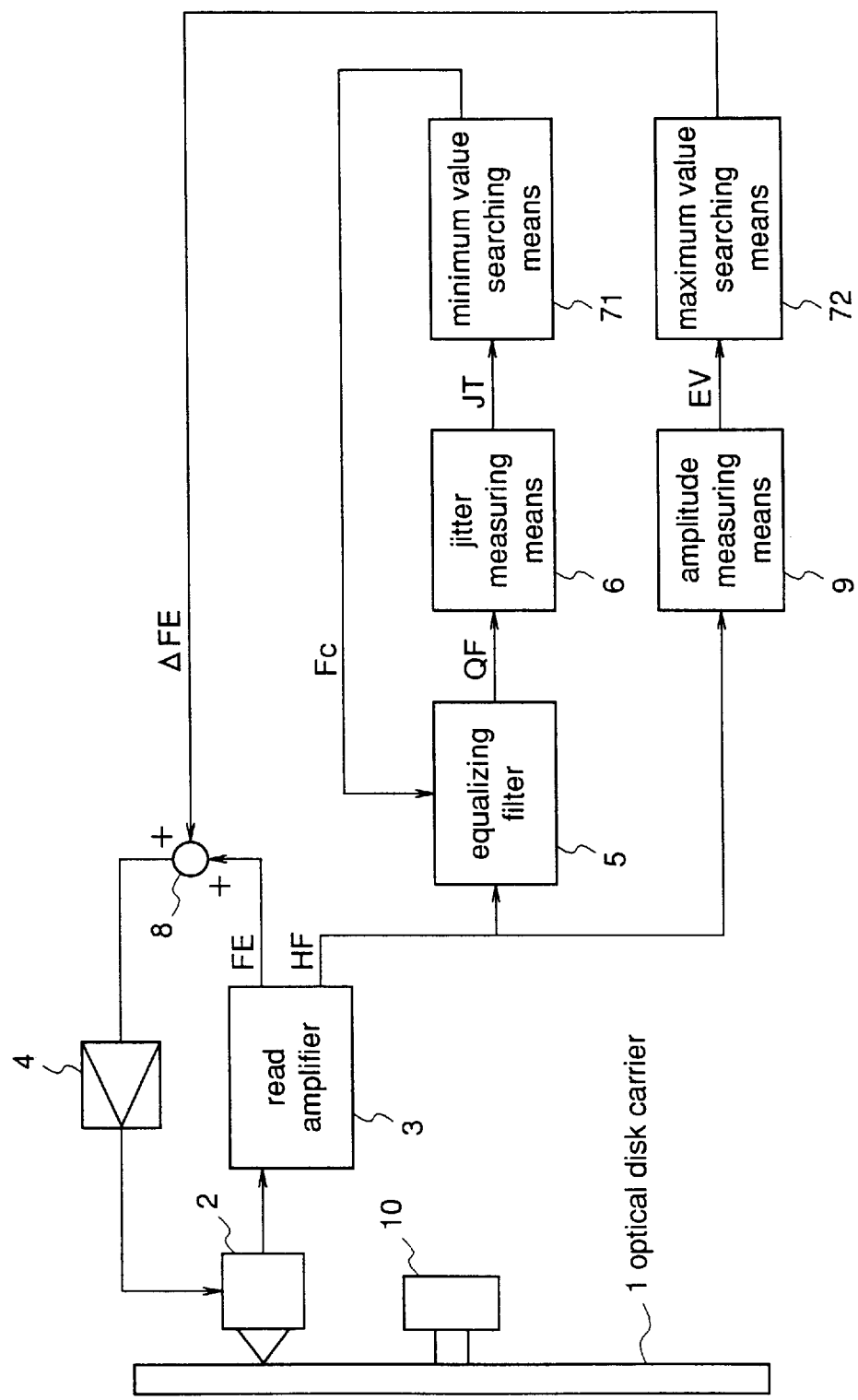
FIG. 8 is a block diagram illustrating a structure of an optical disk drive according to a third embodiment of the present invention.

FIG. 8 is a block diagram illustrating a structure of an optical disk drive according to the third embodiment of the invention. In FIG. 8, an amplitude measuring means 9 measures an amplitude of a read-out information signal output from a read amplifier 3, and outputs an amplitude measurement signal EV. A maximum value searching means 72 changes the focus position compensation signal $\Delta$FE relatively so that the amplitude measurement signal EV is maximized. A minimum value searching means 71 according to this third embodiment changes only the cut-off frequency Fc relatively so that the jitter detection signal JT is minimized. The optical disk 1, optical head 2, read amplifier 3, servo amplifier 4, equalizing filter 5, jitter measuring means 6, adder 8, and spindle motor 10 are identical to those already described for the optical disk drive according to the first embodiment of the invention.

In the optical disk drive according to this third embodiment, an equalization quantity optimization loop comprising the equalizing filter 5, the jitter measuring means 6, and the minimum value searching means 71 is separated from a focus position compensation loop comprising the signal amplitude measuring means 9, the maximum value searching means 72, and the focus control loop. As already described with respect to FIGS. 2 to 4, satisfactory control is not always realized by simply executing the signal equalization system and the focus control system individually. However, imperfect control is attributed to the fact that the same evaluation value, i.e., jitter, is used for both of these systems. So, when these systems are individually controlled using different evaluation values, optimum values can be obtained in the respective systems. In the optical disk drive according to this third embodiment, searching in the signal equalization system is executed so that the jitter signal JT obtained in the jitter measuring means 6 is minimized, while searching in the focus control system is executed so that the amplitude of the read-out signal is maximized.

The operation of the optical disk drive so constructed will be described hereinafter.

The optical head 2 determines a focus position according to a control signal from the servo amplifier 4, focuses laser light on the recording surface of the optical disk 1, reads information recorded on the optical disk 1, and outputs the result to the read amplifier 3. The read amplifier 3 amplifies a signal output from the optical head 2 and outputs a read-out information signal HF to the equalizing filter 5.

The equalizing filter 5 performs equalization according to a cut-off frequency Fc supplied from the minimum value searching means 71, and outputs an equalization signal QF. The equalization signal QF is input to the jitter measuring means 6, and the result of measurement is input to the minimum value searching means 71, as a jitter detection signal JT. The minimum value searching means 71 searches for an equalization quantity at which the jitter is minimized, using a searching method described later, and outputs the cut-off frequency Fc to the equalizing filter 5 according to the equalization quantity obtained. In the equalizing filter 5, since the cut-off frequency Fc is used for equalization, control of waveform equalization is performed.

On the other hand, the read-out information signal HF is input to the amplitude measuring means 9 as well. The amplitude measuring means 9 measures an amplitude of the read-out information signal HF and outputs the result as an amplitude measurement signal EV. The amplitude measuring means 9 employs a measuring method in which the read-out information signal HF is subjected to full wave rectification, and a ripple component is removed to output only a DC component. The amplitude measurement signal EV output from the amplitude measuring means 9 is input to the maximum value searching means 72. The maximum value searching means 72 searches for a focus position at which the amplitude is maximized, using a searching method described later, and outputs a focus compensation signal ΔFE to the adder 8 according to the focus position obtained. In the adder 8, the compensation signal ΔFE is added to the focus error signal FE output from the read amplifier 3, and the result of the addition is fed back, through the servo amplifier 4, to the focus actuator of the optical head 2, whereby focus position control is executed.

Figure 9:
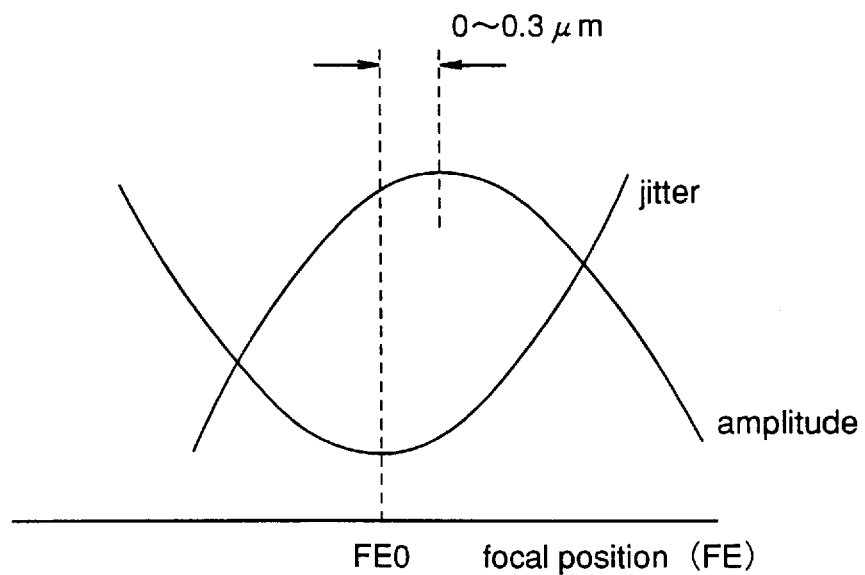
FIG. 9 is a diagram illustrating the relationship between jitter and amplitude.

A description is now given of the searching methods employed by the minimum value searching means 71 and the maximum value searching means 72. In our experiment, as shown in FIG. 9, when the jitter function and the amplitude function, which are plotted with respect to the focus position, are compared, the minimum value of the jitter function approximately matches the maximum value of the amplitude function with an error of 0–0.3 μm. So, a focus position, which is searched so that the signal amplitude EV serving as an evaluation value is maximized, ought to be converged to a point in the vicinity of a position where the jitter is minimized. Since this searching process uses the read-out signal HF before waveform equalization, it can be executed independently of the result of waveform equalization.

The minimum value searching means 71 and the maximum value searching means 72 can be implemented by respective microprocessors, or by plural tasks in a microprocessor.

Figure 10:
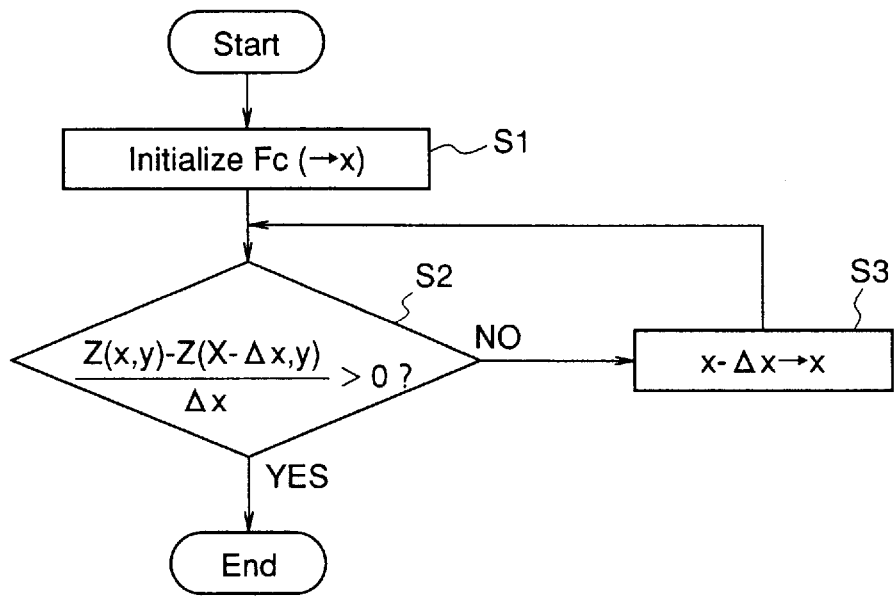
FIG. 10 is a flowchart showing a procedure of minimum jitter value searching performed by the optical disk drive shown in FIG. 8.
Figure 11:
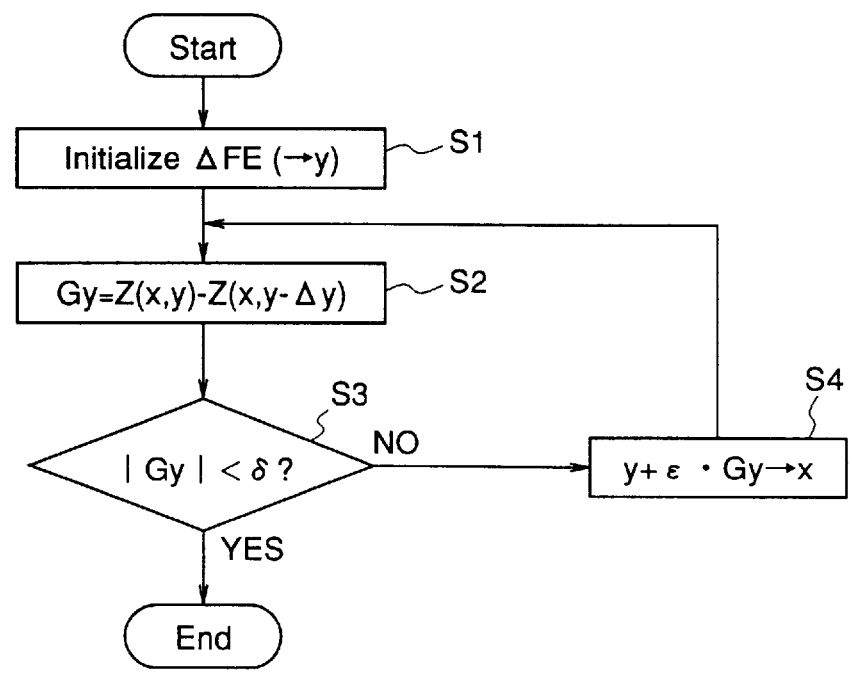
FIG. 11 is a flowchart showing a procedure of minimum amplitude value searching performed by the optical disk drive shown in FIG. 8.

FIGS. 10 and 11 are flowcharts showing procedures by the minimum value searching means 71 and the maximum value searching means 72, respectively.

In FIG. 10, steps 1 to 3 are identical to step 1 to 3 shown in FIG. 6. In these steps, the cut-off frequency Fc (x) of the equalizing filter 5 is gradually reduced from its initial value, and searching is ended when a minimum value of jitter (z) is detected.

In FIG. 11, step 1 is identical to step 1 shown in FIG. 6, and steps 2 to 4 are identical to steps 5 to 7 shown in FIG. 6. While the object of the second embodiment is to minimize the jitter (z), the object of this third embodiment is to maximize the signal amplitude EV (w). Accordingly, the focus position is updated so that the difference Gy in the amplitude (w) approaches 0 when the focus position (y) is changed by a very small amount (Δy). Since the point of Gy=0 is not the minimal point but the maximal point, the direction of the slight change in the focus position performed in step 4 is opposite to that in step 7 shown in FIG. 6.

As described above, in the optical disk drive according to this third embodiment of the invention, the amplitude measuring means 9 for measuring an amplitude EV of the read-out information signal HF and the maximum value searching means 72 for searching for a focus position at which the amplitude EV is maximized are added to the structure according to the first or second embodiment. Therefore, the focus control system is operated independently of the signal equalization system, whereby both of the systems are controlled accurately.

Although in this third embodiment both of the focus control system and the signal equalization system are operated simultaneously, the focus control system may be executed in advance of the signal equalization system. However, to execute the signal equalization system in advance of the focus control system is not desirable because over equalization will occur if equalization control is performed in the focus offset state.

Furthermore, although in this third embodiment an amplitude of the read-out signal is used to search for the focus position, any signal, except jitter, may be used as long as it changes with the focus position. For example, when the read amplifier 3 outputs a tracking error signal, this signal may be used and, also in this case, satisfactory control with high precision is realized.

[Embodiment 4]

In an optical disk drive according to a fourth embodiment of the present invention, even when an optical disk has defects of various sizes on its surface, variations in jitter can be measured accurately while avoiding or canceling the defects.

Figure 12:
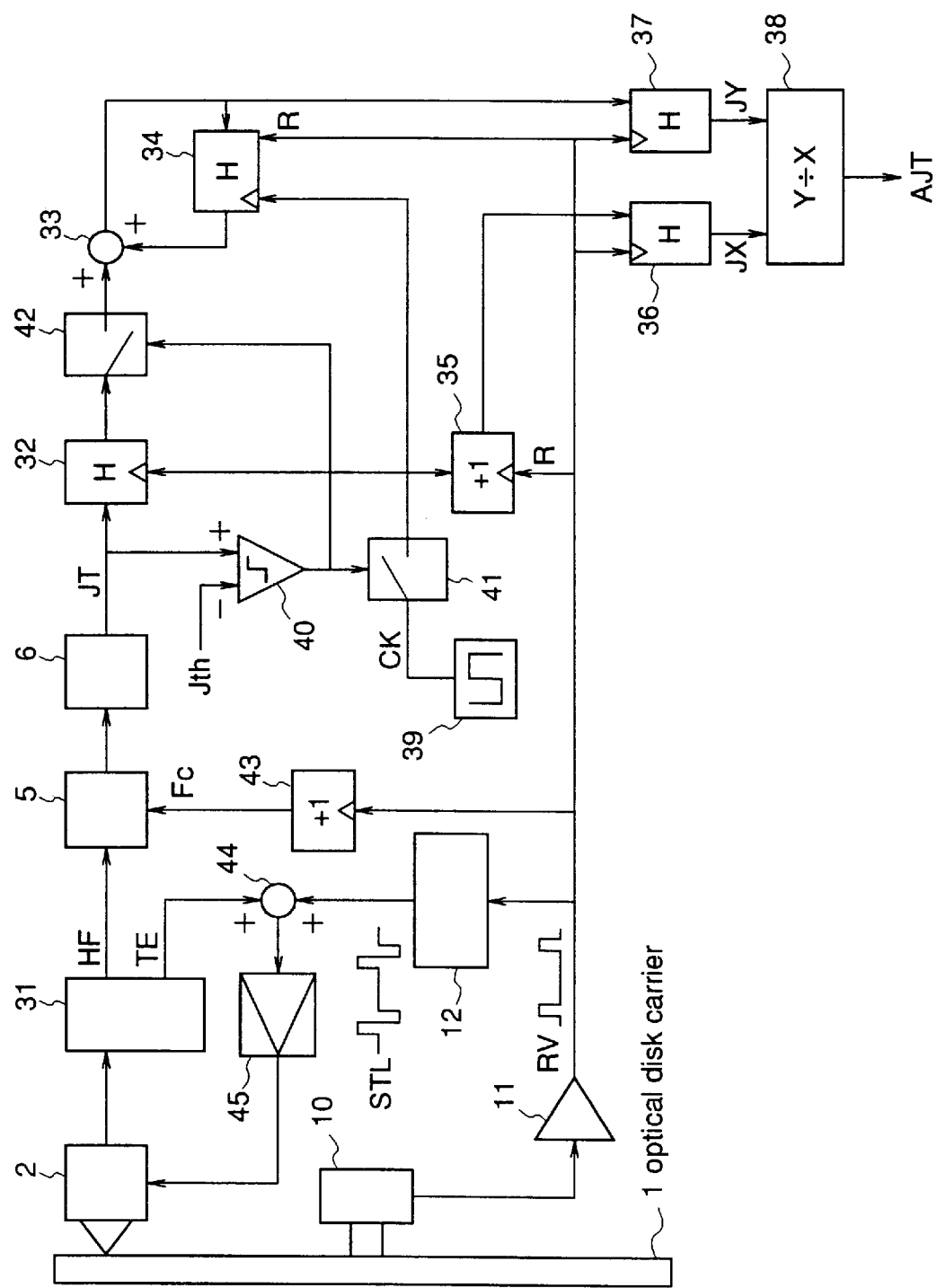
FIG. 12 is a block diagram illustrating a structure of an optical disk drive according to a fourth embodiment of the present invention.

FIG. 12 is a block diagram illustrating a structure of an optical disk drive according to the fourth embodiment of the invention. In FIG. 12, reference numeral 1 designates an optical disk similar to the optical disk employed in the first embodiment. The optical disk 1 has a spiral track on its surface, and information is recorded along the track. A rotation detecting means 11 detects rotation of the spindle motor 10 and outputs a pulse signal RV for every single rotation. A still pulse generating means 12 generates a still pulse signal STL synchronized with the pulse signal RV output from the rotation detecting means 11. A read amplifier 31 performs amplification in the same manner as described for the first embodiment. In this fourth embodiment, however, the read amplifier 31 outputs a read-out information signal HF and a tracking error signal TE. Hold means 32, 34, 36, and 37 temporarily hold input signals. Adders 33 and 44 perform addition of input signals, and output the results. Counters 35 and 43 count input signals. A dividing means 38 divides an output JY from the hold means 36 by an output JX from the hold means 37, and outputs the result as an average jitter signal AJT. A clock generating means 39 generates a clock signal CK for processing. A comparator 40 compares input signals, and generates a control signal when a particular condition is satisfied. Switches 41 and 42 transmit input signals toward the output side when being closed, but stop the flow of the input signals when being open. A tracking amplifier 45 outputs a control signal for controlling the optical head 2 so that it is positioned on a specified track. The optical head 2, equalizing filter 5, jitter measuring means 6, and spindle motor 10 are identical to those already described for the first embodiment of the invention.

The operation of the optical disk drive so constructed will be described hereinafter.

The optical head 2 determines a tracking position according to a control signal output from the tracking amplifier 45, focuses laser light on a specified track on the recording surface of the optical disk 1, reads information recorded on the track, and outputs the result to the read amplifier 31. The read amplifier 31 amplifies a signal output from the optical head 2, outputs a read-out information signal HF to the equalizing filter 5, and outputs a tracking error signal TE to the adder 44. The tracking error signal TE is fed back, through the tracking amplifier 45, to the tracking actuator of the optical head 2, whereby tracking control is executed.

The equalizing filter 5 performs equalization according to a cut-off frequency Fc supplied from the counter 43 which is later described in detail, and outputs an equalization signal QF. The equalization signal QF is input to the jitter measuring means 6, and the result of measurement in the jitter measuring means 6 is input to the hold means 32 as a jitter detection signal JT.

On the other hand, the optical disk 1 is mounted on the spindle motor 10, and the rotation detecting means 11 outputs a pulse signal RV for every single rotation of the spindle motor 10. The pulse signal RV is input to the still pulse generating means 12, the counters 35 and 43, and the hold means 34, 36, and 37. The still pulse generating means 12 generates a still pulse signal STL synchronized with the pulse signal RV, and the signal STL is supplied, through the adder 44, to the tracking amplifier 45. As a result, 'track still operation' is executed. That is, track jumping is performed for every single rotation of the disk in the direction opposite to the reading direction, so that the optical head 2 reads information on the same track over and over.

The clock generator 39 generates a clock signal CK, and the clock signal CK is supplied, through the switch 41, to the hold means 32 and 34 and the counter 35. Since the switch 41 is usually closed, the clock signal is input to the hold means 32 and 34 and the counter 35. According to the clock signal CK, the hold means 32 holds an output signal JT from the jitter measuring means 6 for a period of the clock signal CK, and then outputs the signal JT through the switch 42 to the adder 33. Since the switch 42 is usually closed, the signal JT is input to the adder 33. The adder 33 and the hold means 34 serve as an accumulator for successively accumulating the output from the hold means 32 according to the clock signal CK.

The counter 35 counts the clock signal CK. The hold means 36 and 37 temporarily hold an output from the hold means 34 and an output from the counter 35, respectively, according to the edge of the pulse signal RV synchronized with the rotation of the spindle motor 10, for a period of a single rotation. The dividing means 38 divides an output JY from the hold means 36 by an output JX from the hold means 37, and outputs the result as an average jitter signal AJT. The hold means 34 holding the accumulated jitter value is reset by the pulse signal RV, whereby initialization for the next cycle is performed.

Figure 13:
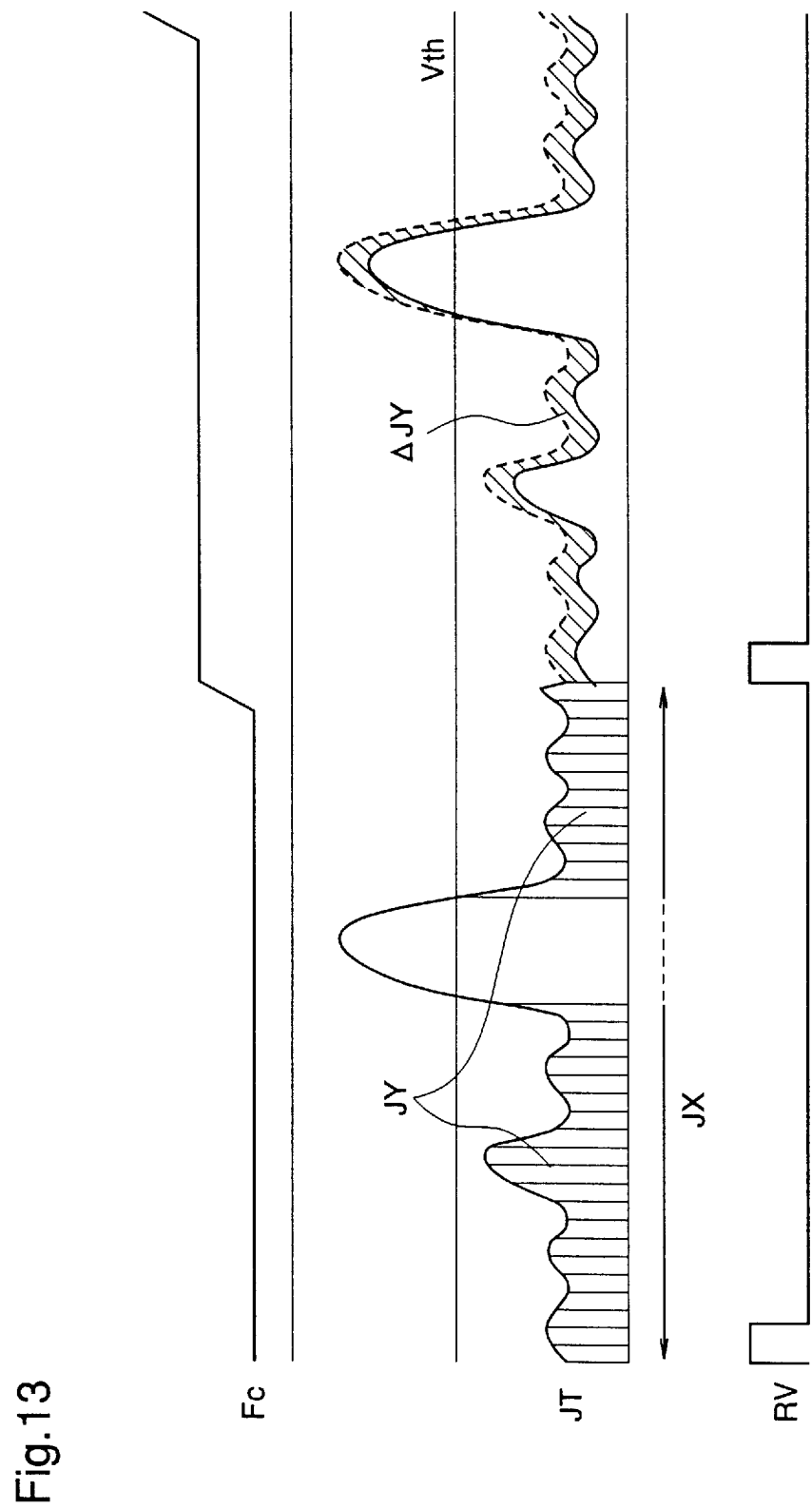
FIG. 13 is a diagram for explaining the operation of the optical disk drive shown in FIG. 8.

FIG. 13 is a diagram for explaining tracking control and jitter measurement in the optical disk drive according to the fourth embodiment. As described above, the surface of the optical disk 1 is easily damaged, and defects on the disk cause errors in jitter measurement. In this fourth embodiment, jitter is always measured on the same track, and the accumulation average of the measured jitter per round of the track is used, thereby to cancel the influence of the defects.

Also in this fourth embodiment, like the first to third embodiments mentioned above, the cut-off frequency Fc of the equalizing filter 5 is varied, and an optimum value of Fc is searched using an increase or a decrease in the jitter with the variation in Fc. Furthermore, as shown in FIG. 13, since the timing to switch the cut-off frequency Fc is synchronized with the rotation detection signal RV using the counter 43, as long as the same track is scanned, defect components are eliminated from the variation in the jitter. That is, when the cut-off frequency Fc of the equalizing filter 5 is changed in response to the rotation detection signal RV as shown in FIG. 13, the jitter detection signal JT changes, as if it shifts horizontally, due to improvement or deterioration in the jitter. Therefore, a variation $\Delta$JY in the jitter at this time is shown by the hatched portion between the dotted line (before change of the equalizing filter) and the solid line and, consequently, the defective portion also changes relatively, whereby its influence is canceled.

Further, in the optical disk drive according to this fourth embodiment, the comparator 40 and the switches 41 and 42 take a countermeasure to a larger defect. The comparator 40 generates a control signal to open the switches 41 and 42 when the jitter detection signal JT exceeds a threshold value Vth, and it serves as a defect detection means in the optical disk drive.

In FIG. 13, the accumulated jitter value Jy generated by the adder 33 and the hold means 34 is an integral of the hatched portion. When a large defect exists in the process of generating the accumulated value Jy, the jitter increases in a moment. In this fourth embodiment, when a large defect is detected, the jitter detection signal JT exceeds a previously set threshold value Vth, and the comparator 40 generates a control signal JOVR, whereby both of the switches 41 and 42 are opened.

When the switch 42 is open, no jitter detection signal is supplied to the adder 33. When the switch 41 is open, no clock signal CK is supplied to the counter 35, and the operation of the counter 35 is halted temporarily. This state continues until the optical head passes through the defective portion and the jitter signal JT becomes lower than the threshold value Vth. When the jitter signal JT is lower than the threshold value Vth, since no control signal JOVR is output from the comparator 40, the switches 41 and 42 are closed. Thereafter, the adder 33 and the hold means 34 resume the processing and continue accumulation until receiving the pulse signal RV. As a result, the hatched portion in FIG. 13 becomes the accumulation result Jy excluding the defective portion, and this result Jy is held in the hold means 37.

When Jy is divided by 'period' in which the accumulation has been carried out, the average is obtained. This 'period' is obtained by counting the clock signal CK by the counter 35. Count end and reset are controlled by the pulse signal RV. Further, while the signal JOVR is being output, i.e., while the defective portion is being read, the switch 41 is open and the count is halted, whereby 'period Jx' excluding the defective portion is held in the hold means 36. Therefore, when the accumulated value Jy is divided by Jx, an average jitter signal AJT excluding the defective portion is obtained.

In this fourth embodiment of the invention, control of the waveform equalization using a jitter as an evaluation value is not described. However, when the cut-off frequency Fc of the equalizing filter is controlled using the average jitter signal AJT in place of the jitter signal JT, searching for the cut-off frequency Fc is executed with high precision while reducing the influence of defects. Further, although only detection of the jitter with respect to the cut-off frequency Fc is described in this fourth embodiment, the same effects as mentioned above are obtained when, in place of the cut-off frequency, the focus position is slightly changed for every single rotation of the optical disk, and the influence of defects is reduced.

As described above, in the optical disk drive according to the fourth embodiment of the invention, the rotation detecting means 11, the still pulse generating means 12, the adder 42, and the tracking amplifier 45 serve as a tracking control means for controlling the optical head 2 so that it scans the same track on the optical disk 1, and the clock generating means 39, the hold means 32, 34, 36, and 37, the counter 35, and the dividing means 38 serve as a jitter averaging means for calculating the average of the jitter, thereby obtaining the accumulation average of measured jitter per round of track, on the same track on the optical disk. Therefore, the influence of defects of the optical disk 1 is reduced in jitter measurement.

Furthermore, the comparator 40 and the switches 41 and 42 serve as a defect detecting means for detecting a defect when the jitter detection signal JT exceeds the threshold value Vth and as a calculation control means for stopping the calculation of the accumulation average of the jitter. Therefore, a large defect is detected before it adversely affects the measurement.

While in this fourth embodiment the magnitude of the jitter signal JT is used for detecting defects on the optical disk, other information obtained from the read-out signal may be used. For example, when an amplitude measuring means as shown in FIG. 8 is employed, a sudden drop in detected amplitude can be used for the detection of defects.

[Embodiment 5]

In an optical disk drive according to a fifth embodiment of the present invention, the influence of defects is avoided by performing searching in a less defective region near the inner circumference (inside edge) of the optical disk.

Figure 14:
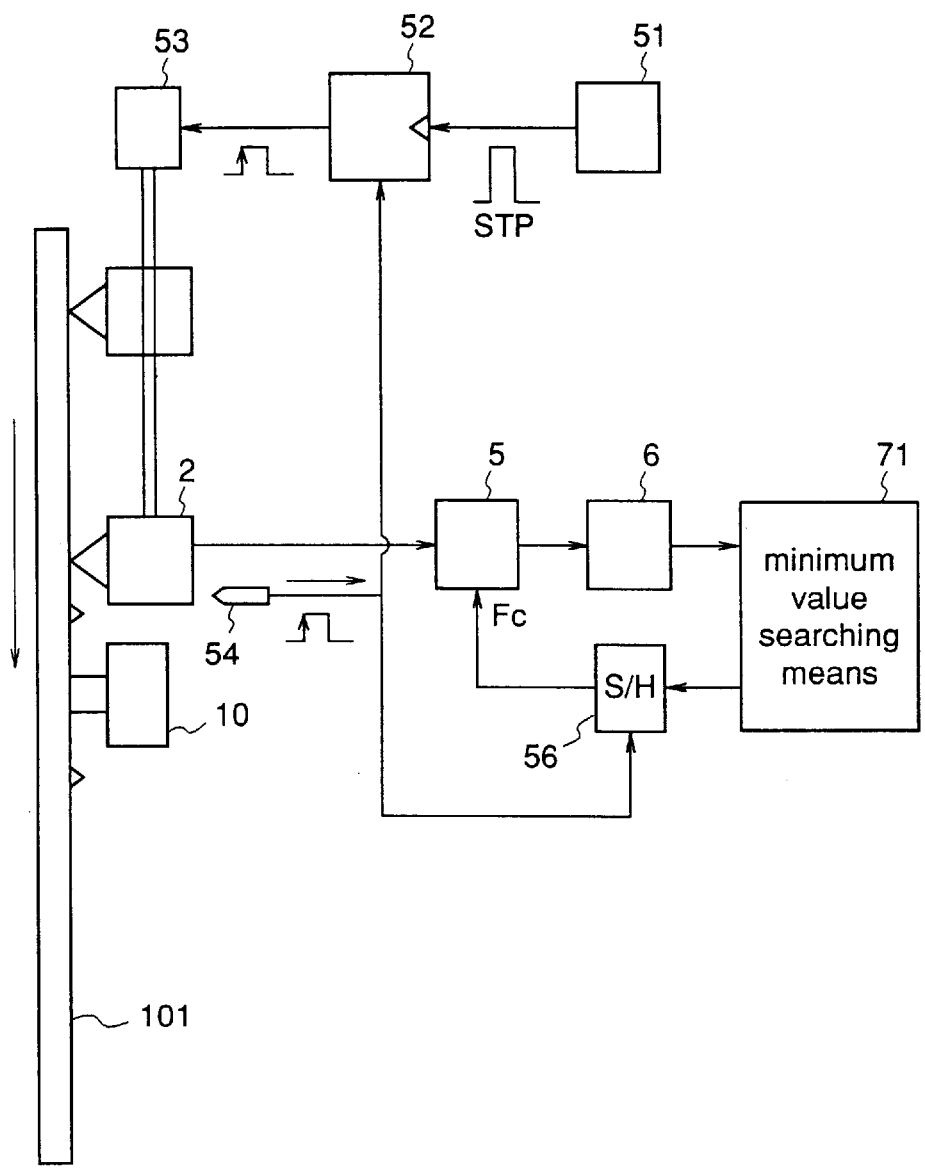
FIG. 14 is a block diagram illustrating a structure of an optical disk drive according to a fifth embodiment of the present invention.

FIG. 14 is a block diagram illustrating a structure of an optical disk drive according to the fifth embodiment of the invention. In FIG. 14, reference numeral 101 designates an optical disk which is shown in FIG. 15 in detail. A controller 51 outputs a pulse signal for controlling movement of the optical head 2. A flip-flop 52 outputs a signal of 'H' (high) or 'L' (low) in response to an input signal. A traverse motor 53 drives the optical head 2. A sensor 54 is positioned in the vicinity of the innermost circumference (innermost edge) of the optical disk 101. The sensor 54 detects the optical head and outputs a signal. A sample/hold circuit 56 transmits an input signal supplied from the minimum value searching means 71 to the equalizing filter 5 when it is in the sample mode (switch on state), but it stops the flow of the input signal when it is in the hold state (switch off state). The minimum value searching means 71 searches for a cut-off frequency of the equalizing filter 5 at which the jitter is minimized as described for the third embodiment. However, unlike the third embodiment, the result of the searching is not input directly to the equalizing filter 5, but it is input to the sample/hold circuit 56. The optical head 2, equalizing filter 5, jitter measuring means 6, and the spindle motor 10 are identical to those already mentioned with respect to the first embodiment.

The operation of the optical disk drive so constructed will be described hereinafter.

First of all, the controller 51 outputs a start pulse STP to make the flip-flop 52 output 'H'. Receiving the 'H' signal from the flip-flop 52, the traverse motor 53 moves the optical head 2 toward the inner circumference of the optical disk 101. When the optical head 2 reaches the vicinity of the innermost circumference of the recoding surface of the optical disk 101, the sensor 54 detects this and outputs a flag signal D. The flag signal D is input to the flip-flop 52 and the sample/hold circuit 56. The flip-flop 52 is reset by the flag signal D, and outputs 'H' to the traverse motor 53. Receiving the 'H' signal, the traverse motor 53 stops the optical head 2.

Then, using the flag signal D, searching of an optimum equalization quantity is executed by the jitter minimizing method. That is, when the flag signal D is input, the sample/hold circuit 56 is in its sample mode, and the loop, wherein the minimum value searching means 71 searches for an equalizing filter cut-off frequency Fc at which the jitter detection signal JT output from the jitter measuring means 6 is minimized, is closed. The equalizing filter cut-off frequency Fc output from the minimum value searching means 71 is input to the equalizing filter 5.

In ordinary operation of the drive, i.e., reproduction of information, the optical head 2 moves toward the outer circumference (outer edge) of the disk, and the sensor 54 does not detect the optical head 2. So, no flag signal D is output, and the sample/hold circuit 56 is in its hold mode. Thereafter, the equalizing filter cut-off frequency Fc determined as a result of the minimum value searching is maintained, whereby waveform equalization process is performed.

In other words, the above-mentioned operation is to perform the searching for equalizing filter optimization in a region near the innermost circumference of the optical disk. The reason why the searching is performed in such a region will be described hereinafter.

FIG. 15(*a*) is a plan view of the optical disk 101, and FIG. 15(*b*) is a cross-sectional view taken along line A-B in FIG.

15(*a*). In these figures, numeral 102 designates a projection and numeral 103 designates an information recording region. Most optical disks, such as CDs and VDs, are used without being inserted in cartridges and, therefore, these disks get many defects while being used for many hours, as shown in FIG. 15. These defects cause not only errors in information reproduction but also imperfect control in equalizing filter optimization.

The greater part of these defects are 'scratches' produced when the disk surface is rubbed with a desk or the like. In this fifth embodiment, a projection 102 is formed inside the information recording region 103 of the optical disk 101 to prevent a region in the vicinity of the projection (innermost circumference region) from contacting a flat surface of a desk or the like. As a result, the innermost circumference region is less defective than the other region. Therefore, when the searching for an optimum equalizing coefficient is performed only in the innermost circumference region, the influence of defects is reduced.

As described above, in the optical disk drive according to the fifth embodiment of the invention, the traverse motor 53 serves as a transfer means for moving the optical head 2 toward the less defective inner circumference region of the optical disk 101. The sensor 54, the controller 51, and the flip-flop 52 serve as a transfer control means for controlling the movement of the optical head. The sample/hold circuit 56 serves as an equalization quantity setting means for performing waveform equalization with an equalization quantity that is searched in the innermost circumference region of the optical disk 101. Since the equalization quantity searched in the less defective innermost circumference region is used for waveform equalization, the influence of defects on the optical disk 101 on the searching is reduced, resulting in highly precise control.

Although focus searching is not described in this fifth embodiment, since the accuracy in minimizing the jitter is improved, the same effect as that obtained in the optimization of the equalizing filter is expected. That is, the effect of reducing the influence of defects according to this fifth embodiment is applicable to searching for all parameters using jitter as an evaluation value. Further, with respect to focus searching, using the structure shown in FIG. 8 according to the third embodiment, signal amplitude may be used as an evaluation value.

Furthermore, when the optical disk drive according to this fifth embodiment is combined with the optical disk drive according to the fourth embodiment, i.e., when the jitter is averaged for each single rotation of the disk in the less defective innermost circumference region, the influence of defects is further reduced.

Furthermore, although in this fifth embodiment the sensor 54 is used for detecting whether or not the optical head 2 is positioned at the innermost circumference of the optical disk, it may be detected from an address signal or another identification signal which is read by the optical head 2 itself.

Moreover, although in this fifth embodiment the equalizing filter set value is held according to the output signal from the sensor 54, when this signal is not used, the controller 51 may output a hold signal at an appropriate time after the searching.

[Embodiment 6]

In an optical disk drive according to a sixth embodiment of the present invention, utilizing the fact that the focus vs. jitter characteristic is gentle in the over-equalized state, deterioration in jitter due to focus variation attendant on track jumping is reduced, whereby address information and the like are detected with higher accuracy.

Figure 16:
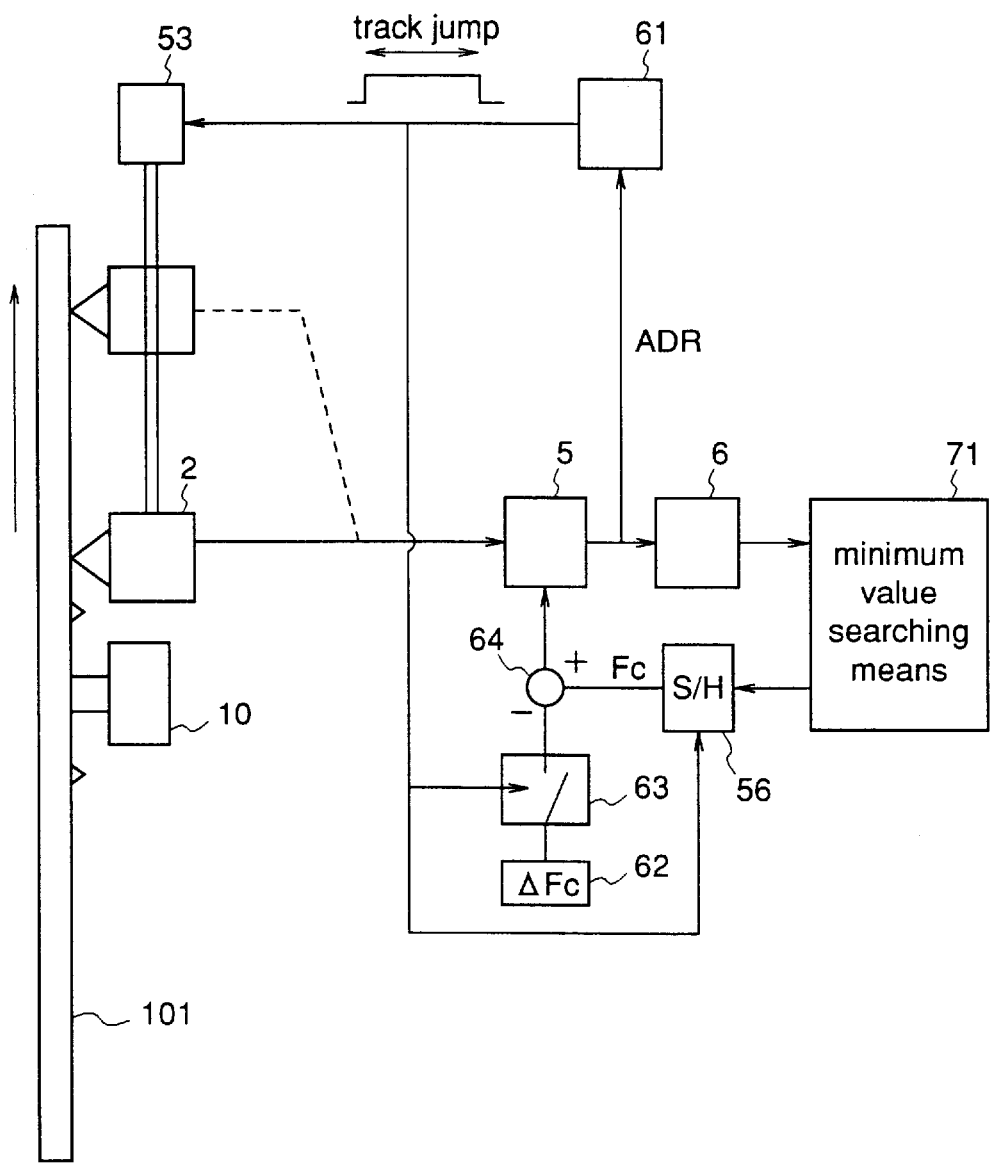
FIG. 16 is a block diagram illustrating a structure of an optical disk drive according to a sixth embodiment of the present invention.
Figure 17:
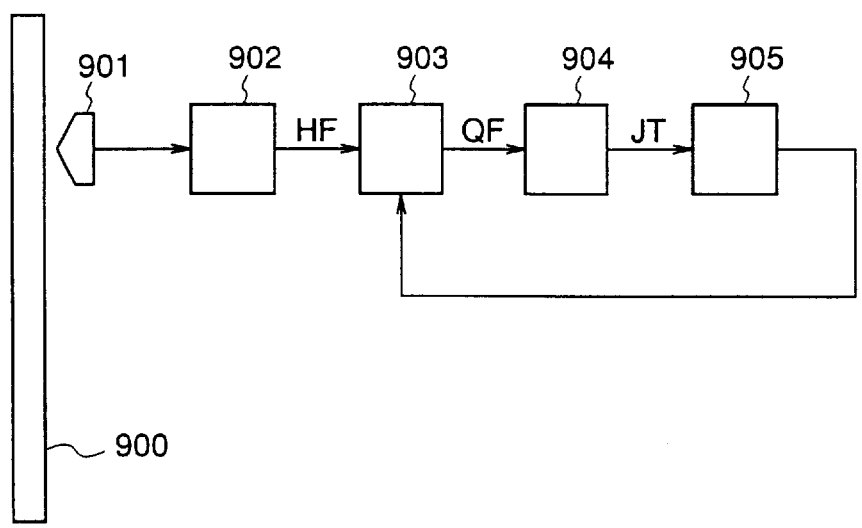
FIG. 17 is a block diagram illustrating a structure of an optical disk drive according to the prior art.

FIG. 16 is a block diagram illustrating a structure of an optical disk drive according to the sixth embodiment of the present invention. In FIG. 16, a controller 61 generates a track jumping command signal TJP that becomes 'H' (high) at track jumping. A traverse motor 53 moves the optical head 2 in the radial direction of the optical disk 101, according to the track jumping command signal TJP output from the controller 61. A memory 62 stores an equalizing filter cut-off frequency that is set in advance. An equalizing filter cut-off frequency to be stored in the memory 62 is set at a value by which waveform equalization results in over equalization. A switch 63 outputs the content stored in the memory 62 to an adder/subtracter 64 when it is closed. The adder/subtracter 64 performs addition and subtraction of an input signal. The optical disk 1, optical head 2, spindle motor 10, equalizing filter 5, and jitter detecting means 6 are identical to those employed for the first embodiment. The sample/hold circuit 56 and the minimum value searching means 71 are identical to those employed for the fifth embodiment.

A description is given of the operation of the optical disk drive so constructed.

As already described above, the optical disk 101 has a spiral track on its recording surface, and information is recorded on this track. In ordinary reproduction, the optical head reads the information along the track. However, when it is necessary to read information recorded on a distant track, the optical head moves to the track in a moment, i.e., 'track jumping' is performed.

When the optical head 2 is scanning the track without track jumping, the track jumping command signal TJP output from the controller 61 is 'L', the sample/hold circuit 56 is in its sample mode, and the switch 63 is open. At this time, the equalizing filter 5, the jitter detecting means 6, and the minimum value searching means 71 make a closed loop, and a cut-off frequency Fc is determined so that a detected jitter value JT is minimized.

Track jumping is performed as follows. The controller 61 outputs a track jumping command signal TJP (L→H) to the traverse motor 53, and the traverse motor 53 starts in response to the signal TJP, whereby the optical head 2 moves. The track jumping command signal TJP is supplied to the sample/hold circuit 56 and the switch 63 as well. Receiving the track jumping command signal TJP, the sample/hold circuit 56 is switched to the hold mode simultaneously with the move of the optical head 2. Further, receiving the track jumping command signal TJP, the switch 63 is closed, and a compensation value ΔFc stored in the memory 62 is input to the subtracter 64. The compensation value ΔFc is subtracted from the cut-off frequency Fc which is supplied from the sample/hold circuit 56 to the subtracter 64, and a result of the subtraction is input to the equalizing filter 5.

That is, in place of the cut-off frequency Fc searched by the minimum value searching means 71, Fc−ΔFc is set. As a result, an equalization signal output from the equalizing filter 5 is over-equalized. Since the cut-off frequency Fc just before being held has a value at which the jitter is minimized, the jitter increases as Fc changes, but it becomes rather resistant to focus disturbance caused by vibrations attendant on the move of the optical head 2.

The above will be described in more detail using FIG. 4. When the equalizing filter 5 is in its optimum equalized state (Fc0), the jitter is surely minimized at the focus optimized point (FE0). However, with an increase in error of focus position, the jitter deteriorates steeply. On the other hand, when the equalizing filter is in its over-equalized state (Fc−ΔFc), although the jitter increases at the focus optimized point (FE0), the increase in jitter attendant on the focus position error is gentle. So, when the focus position has a measure of error, the jitter is sometimes smaller in the case where the equalizing filter 5 is in its over-equalized state than in the case where it is in its optimized state. In ordinary reproduction with no track jumping, as it is desirable that the jitter should be minimized, the focus optimized point is searched at appropriate time and the result is held. In this case, even though the focus vs. jitter characteristic is steep as mentioned above, it does not adversely affect the reproduction. However, when track jumping is executed as in this sixth embodiment, a focus error may occur in a moment due to vibration or shock at the track jumping. When a regular focus error is expected as in ordinary reproduction, it can be absorbed using a searching method. However, it is practically impossible to absorb a focus error that occurs in a moment.

In this sixth embodiment of the invention, utilizing the focus vs. jitter characteristic in the over-equalized state, the jitter at such a sudden focus error is improved to some extent. That is, to change the cut-off frequency from Fc which has been searched as an optimum one to Fc−ΔFc just after track jumping (TJP=L→H) is nothing but to switch the equalizing filter 5 from the optimum equalized state to the over-equalized state. As a result of the change from Fc to Fc−ΔFc, the focus vs. jitter characteristic becomes like 'a bottom of a pot' as shown in FIG. 4, so that an increase in jitter can be suppressed to some degree even when the focus deviates considerably. The purpose in using the track jumping command signal TJP to change the sample/hold circuit 56 into the hold mode is to prevent the searching for the optimum value from being executed during track jumping.

When track jumping to a target address ADR has been done, the controller 61 changes the track jumping command signal TJP to 'L' to stop the traverse motor 53. At this time, the switch 63 is opened, and the cut-off frequency used in the equalizing filter 6 is returned to Fc. As a result, reproduction of information is resumed in the state where the jitter is minimized.

According to the sixth embodiment of the invention, in the optical disk drive equipped with the controller 61, the switch 63, the memory 62, and the sample/hold circuit 56, when track jumping is carried out, the cut-off frequency used by the equalizing filter 5 is set in advance so that it is over-equalized, by changing the mode using the switch 63 and the sample/hold circuit 56, and the focus vs. jitter characteristic in the over-equalized state is utilized. Therefore, even when a focus error occurs due to vibration or shock at the track jumping, an increase in the jitter attendant on the focus error is suppressed. As a result, address detection is performed accurately at the track jumping.

As described above, in this sixth embodiment of the invention, expecting a focus error attendant on track jumping, a cut-off frequency is set in advance so that it should be optimum when the focus error occurs, i.e., so that it is over-equalized as compared with the optimum frequency searched, and the set cut-off frequency is used only during track jumping. However, the cut-off frequency being over-equalized as compared with the searched one may be used not only during track jumping but ordinary. In this case, the work load on the controller is reduced, and the controller can cope with an unexpected focus error. Especially when track jumping is continuously repeated, the speed of entire processing is increased.

Further, the above-mentioned setting of cut-off frequency can be a countermeasure to 'disk tilt' caused by deformation of disk. Since a disk tends to be deformed at its outer circumference, when searching for cut-off frequency is performed in the less defective inner circumference region of the disk and waveform equalization is performed using the searched cut-off frequency as described for the fifth embodiment, under-equalization may occur in the outer circumference region. To avoid such under-equalization, the cut-off frequency is controlled so that it is always over-equalized, whereby satisfactory waveform equalization is performed regardless of the inner and outer circumferences of the disk.

Furthermore, although in this sixth embodiment the sample/hold circuit 56 is switched to the hold mode simultaneously with the start of track jumping, this mode switching may be performed before track jumping.

While in the first to sixth embodiments of the invention the cut-off frequency is changed to change the equalization quantity, in place of the cut-off frequency, gain G (refer to FIG. 2) may be changed. Or, both of the cut-off frequency and the gain G may be changed. Also in these cases, the same effects as mentioned above are obtained.

In the first to sixth embodiments of the invention, the minimum (maximum) value searching means can be implemented by microprocessors. Since a microprocessor itself performs digital processing, jitter signal JT input to the searching means, signals Fc and ΔFE output from the searching means, and focus error signal FE to be added to ΔFE are treated as digital signals in the aforementioned embodiments. However, it is not important whether these signals are digital or analog. It is merely a matter of design relating to location of AD converters and DA converters. Accordingly, the optical disk drives according to the aforementioned embodiments are applicable to processing using analog signals.

What is claimed is:

1. An optical disk drive for reading information recorded on a recording surface of an optical disk medium using an optical head to generate a read-out signal, comprising:

focus position control means for controlling a focal point of a light beam emitted from the optical head so that it is positioned on a focus position that is set as a position in the vicinity of the recording surface of the optical disk medium;

equalizing means for performing waveform equalization using a set equalization quantity, to the read-out signal generated by the optical head, and outputting an equalization signal;

jitter measuring means for measuring a jitter of the equalization signal output from the equalizing means; and optimum value searching means for searching for a focus position and an equalization quantity, at which the jitter is minimized.

2. The optical disk drive of claim 1 wherein the optimum value searching means is two-dimensional searching means that searches for the focus position and the equalization quantity, at which the jitter is minimized, by two-dimensionally changing the focus position and the equalization quantity.

3. The optical disk drive of claim 2 wherein the two-dimensional searching means comprises:

differential operating means for obtaining differential values of the jitter to the focus position and the equalization quantity;

vector operating means for obtaining a two-dimensional vector on the basis of the differential values obtained by the differential operating means; and focus position and equalization quantity setting means for updating the focus position and the equalization quantity in the direction of the two-dimensional vector obtained by the vector operating means;

wherein the two-dimensional searching is performed by repeating the operation to obtain the differential values by the differential operating means, the operation to obtain the vector by the vector operating means, and the setting of the focus position and the equalization quantity by the focus position and equalization quantity setting means.

4. The optical disk drive of claim 2 wherein the two-dimensional searching means comprises:

minimum value searching means for setting a focus position and searching for an equalization quantity at which the jitter is minimized in the set focus position;

under-equalizing means for setting an equalization quantity that is under-equalized as compared with the searched equalization quantity; and focus position searching means for searching for a focus position in which the jitter is minimized at the equalization quantity set by the under-equalizing means;

wherein the two-dimensional searching is performed by repeating the searching for the equalization quantity by the minimum value searching means, the setting of the equalization quantity by the under-equalizing means, and the searching for the focus position by the focus position searching means.

5. The optical disk drive of claim 3 wherein the two-dimensional searching means includes initial value setting means for setting 'under-equalized state' as an initial value.

6. The optical disk drive of claim 4 wherein the two-dimensional searching means includes initial value setting means for setting 'under-equalized state' as an initial value.

7. The optical disk drive of claim 1 further comprising:

amplitude measuring means for measuring an amplitude of the read-out signal generated by the optical head; and said optimum value searching means comprising:

minimum value searching means for searching for an equalization quantity at which the jitter is minimized, by changing the equalization quantity; and maximum value searching means for searching for a focus position in which the amplitude is maximized, by changing the focus position.

8. The optical disk drive of claim 1 further comprising:

tracking control means for setting the focus position on the same track on the optical disk medium; and jitter averaging means for calculating the average of the jitter for a single round of the track.

9. The optical disk drive of claim 8 further comprising:

defect detecting means for detecting defects on the optical disk medium; and calculation control means for stopping the calculation by the jitter averaging means when the detecting means detects a defect.

10. The optical disk drive of claim 9 wherein the defect detecting means detects a defect by comparing the jitter of the read-out signal with a threshold value.

11. The optical disk drive of claim 1 further comprising:

transfer means for moving the optical head in the radial direction of the optical disk medium; and transfer control means for controlling the transfer means so that the optical head is positioned at the possible innermost circumference of the optical disk medium before execution of the searching by the optimum value searching means.

12. The optical disk drive of claim 11 wherein the optical disk medium has a projection in a region near the innermost circumference.

13. The optical disk drive of claim 1 further comprising equalization quantity switch means for selecting, as an equalization quantity used by the equalizing means, one of the value searched by the optimum value searching means and a value that is set in advance and over-equalized as compared with the searched value.

14. The optical disk drive of claim 13 wherein the equalization quantity switch means uses the set value when track jumping of the optical head is performed on the optical disk medium, and uses the value searched by the optimum value searching means when track jumping is not performed.

15. The optical disk drive of claim 14 wherein the optimum value searching means does not perform the searching when track jumping is performed.

* * * * *